(12) United States Patent
Lee et al.

(10) Patent No.: US 10,664,129 B2
(45) Date of Patent: May 26, 2020

(54) ELECTRONIC DEVICE AND METHOD OF OPERATING THE SAME

(71) Applicant: Samsung Electronics Co., Ltd., Gyeonggi-do (KR)

(72) Inventors: Jae-Myoung Lee, Seoul (KR); Young-Mi Kim, Seoul (KR); Young-Seong Kim, Seoul (KR); Seung-Wook Nam, Gyeonggi-do (KR); Hyo-Sang Bang, Seoul (KR); Sang-Su Lee, Daejeon (KR); Youngjay Lee, Gyeonggi-do (KR); Kyung-Soo Lim, Gyeonggi-do (KR); Soe-Youn Yim, Seoul (KR); Martin Jung, Seoul (KR); Jin-Hoon Cho, Gyeonggi-do (KR); Hyun-Yeul Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 95 days.

(21) Appl. No.: 15/943,263

(22) Filed: Apr. 2, 2018

(65) Prior Publication Data

US 2018/0292974 A1    Oct. 11, 2018

(30) Foreign Application Priority Data

Mar. 31, 2017 (KR) .................. 10-2017-0042004

(51) Int. Cl.
*G06F 3/0481* (2013.01)
*G06F 3/0488* (2013.01)
*G06F 3/041* (2006.01)
*G06F 3/047* (2006.01)

(52) U.S. Cl.
CPC .......... *G06F 3/04817* (2013.01); *G06F 3/047* (2013.01); *G06F 3/0414* (2013.01); *G06F 3/0416* (2013.01); *G06F 3/04883* (2013.01)

(58) Field of Classification Search
CPC ............. G06F 3/04817; G06F 3/04883; G06F 3/0414; G06F 3/0416; G06F 3/047
See application file for complete search history.

(56) References Cited

U.S. PATENT DOCUMENTS

| 2014/0002502 | A1* | 1/2014 | Han | G06T 11/60 345/646 |
| 2015/0363084 | A1* | 12/2015 | Spjuth | G06T 11/60 715/716 |
| 2017/0017355 | A1* | 1/2017 | Lim | G06F 3/0482 |

FOREIGN PATENT DOCUMENTS

KR    10-2013-0081053    7/2013

* cited by examiner

*Primary Examiner* — Muhammad N Edun
(74) *Attorney, Agent, or Firm* — The Farrell Law Firm, P.C.

(57) ABSTRACT

An electronic device is provided and includes a touch screen and a processor that is configured to display a first object among a plurality of sequentially arranged objects on the touch screen, display, when a first user input that satisfies a designated condition is detected via the touch screen while the first object is displayed, a second object arranged subsequent to the first object according to an arrangement order among the plurality of objects on the touch screen, and display, when a second user input that does not satisfy the designated condition is detected via the touch screen while the first object is displayed, a third object designated regardless of the arrangement order among the plurality of objects on the touch screen.

20 Claims, 18 Drawing Sheets

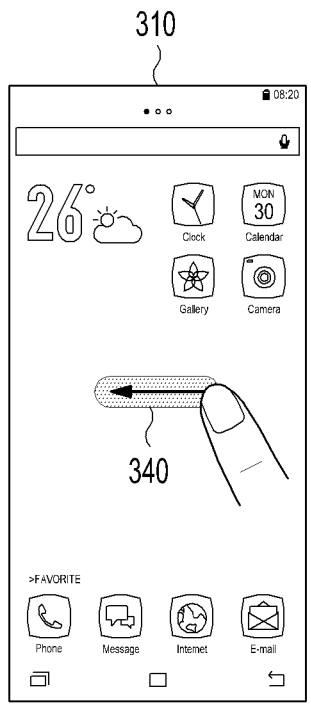 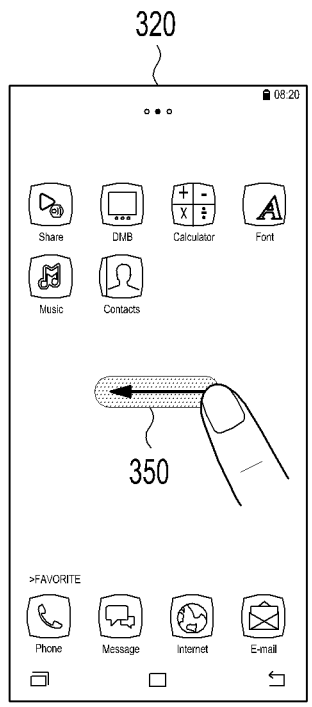 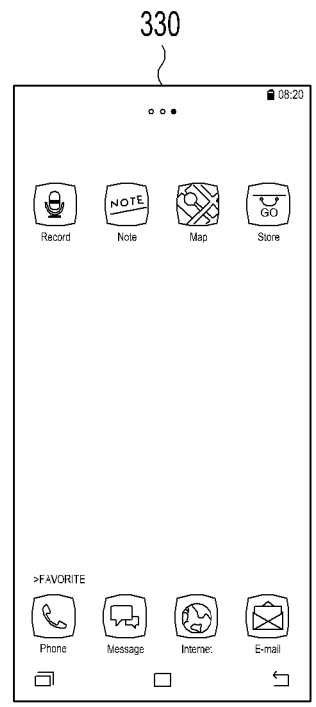
FIG.3A　　　　　FIG.3B　　　　　FIG.3C
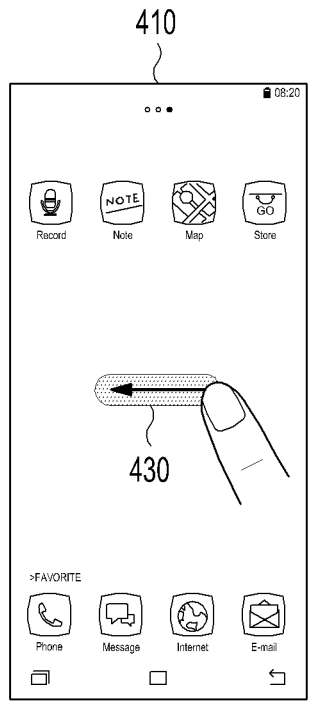 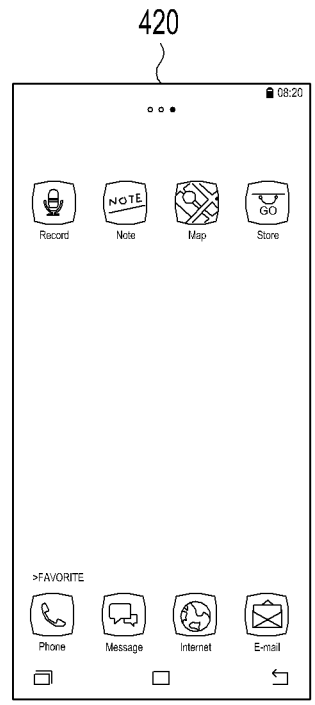
FIG.4A　　　　　FIG.4B

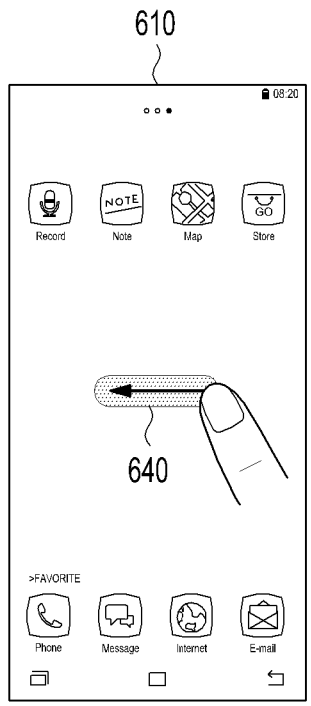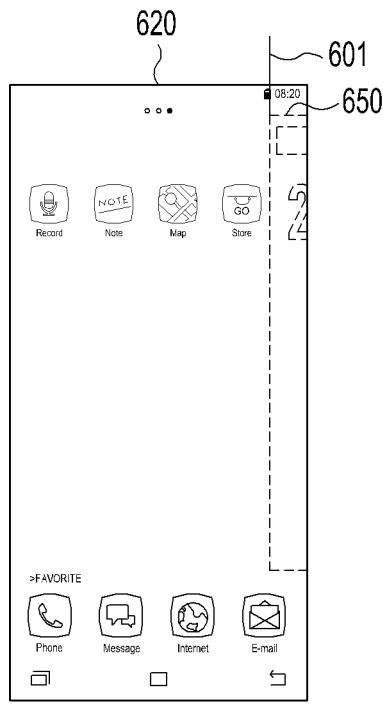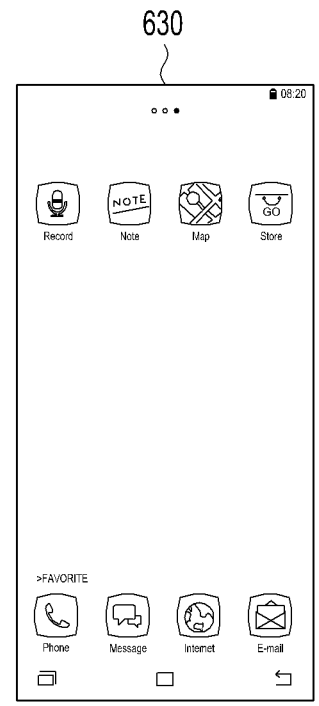
FIG.6A  FIG.6B  FIG.6C
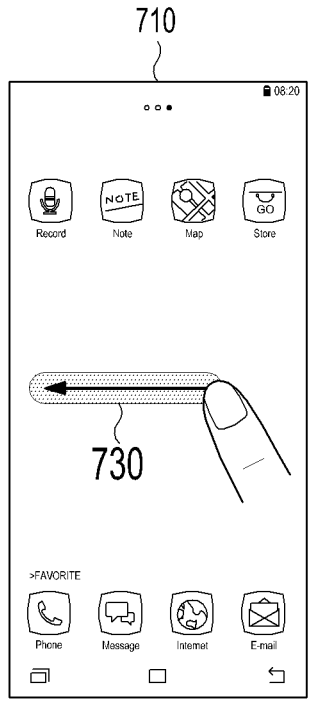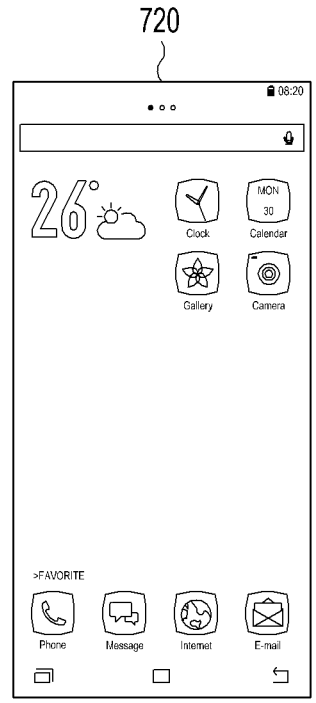
FIG.7A  FIG.7B

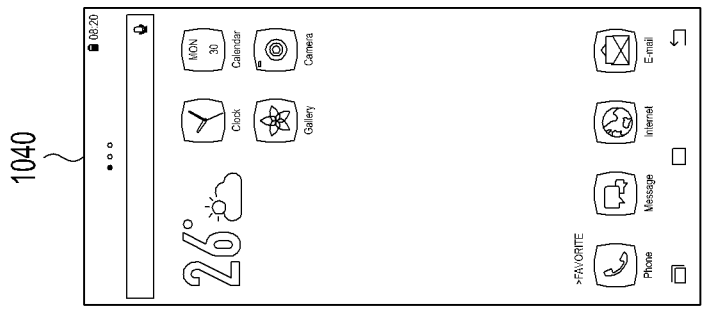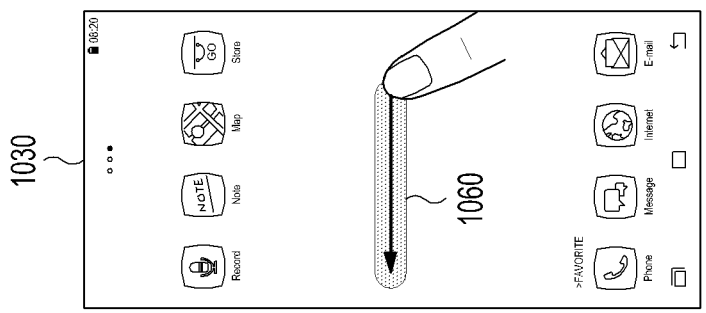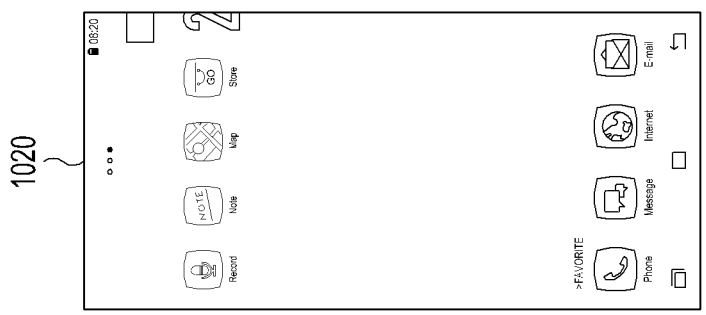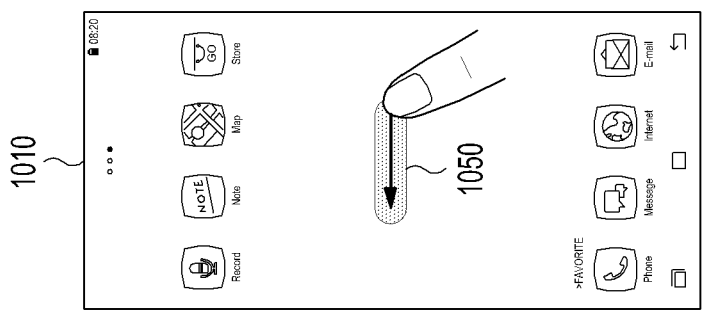

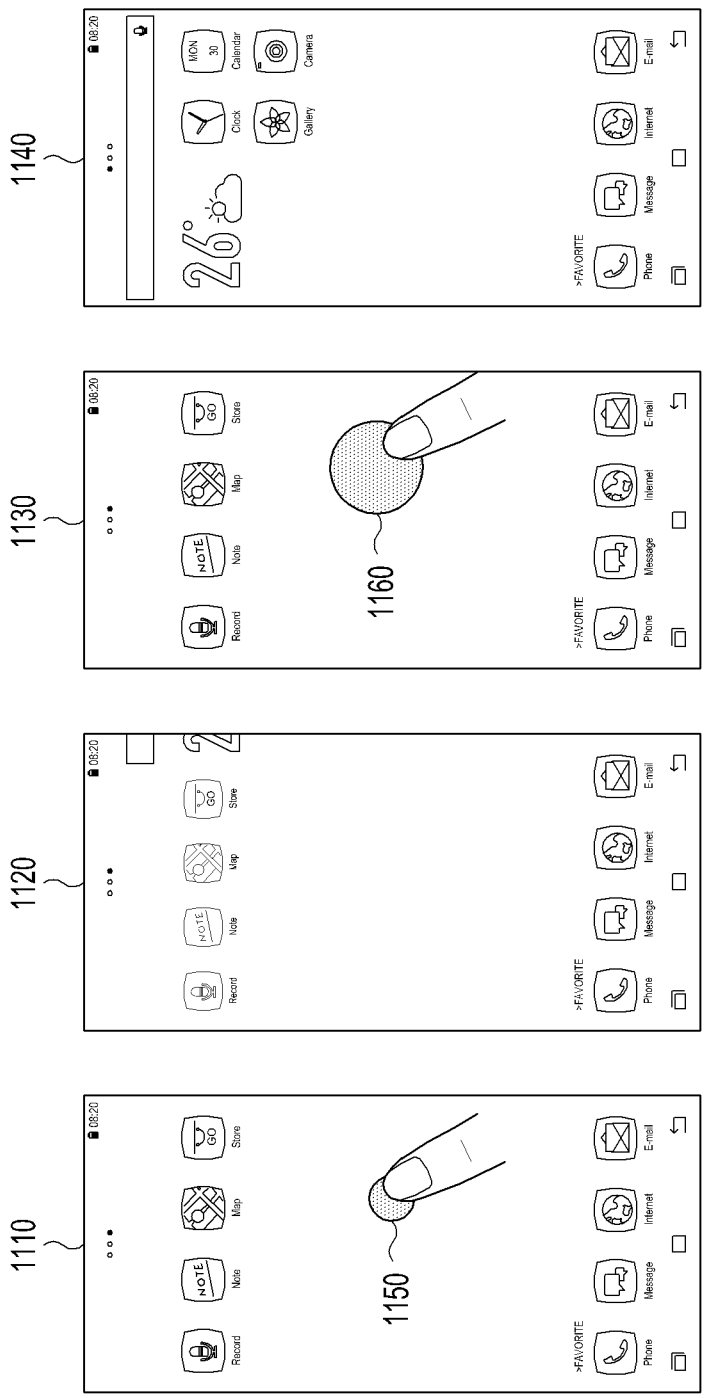

ELECTRONIC DEVICE AND METHOD OF OPERATING THE SAME

CROSS-REFERENCE TO RELATED APPLICATION

This application is based on and claims priority under 35 U.S.C. § 119(a) to Korean Patent Application Serial No. 10-2017-0042004, which was filed in the Korean Intellectual Property Office on Mar. 31, 2017, the entire content of which is incorporated herein by reference.

BACKGROUND

1. Field

The disclosure relates, generally to an electronic device and a method of operating the same, and, more particularly, to an electronic device that uses a method for displaying an object in response to a user input.

2. Description of the Related Art

In recent years, electronic devices such as smart phones, tablet personal computers (PCs), personal digital assistants (PDAs), navigation devices, and the like have been manufactured so that they have increasingly larger screens/displays. For example, a full screen may be provided, a single opaque screen may be provided with a combination of two transparent screens, or a combination of multiple screens may be provided.

A user input that can be detected via the screen can also be provided in various ways such as a simple touch input, a flick input, a swipe input, a scrolling input, a force touch input, and the like.

Moreover, a user can execute various functions by the user inputs while intuitively interacting with the screen. By reflecting a user's intention to a corresponding user input, it is possible to provide an additional user input in addition to a designated relationship between the user input and a function to be executed, and a function to be additionally executed.

SUMMARY

The present disclosure has been made to address at least the disadvantages described above and to provide at least the advantages described below. According to an embodiment, there is provided an electronic device that may execute a function of an additional touch screen with only a user's additional touch input, without presenting a control icon on the touch screen, and a method of operating the same.

In accordance with an embodiment, there is provided an electronic device that includes a touch screen and a processor that is configured to display a first object among a plurality of sequentially arranged objects on the touch screen, display, when a first user input that satisfies a designated condition is detected via the touch screen while the first object is displayed, a second object arranged subsequent to the first object according to an arrangement order among the plurality of objects on the touch screen, and display, when a second user input that does not satisfy the designated condition is detected via the touch screen while the first object is displayed, a third object designated regardless of the arrangement order among the plurality of objects on the touch screen.

In accordance with another embodiment, there is provided an electronic device that includes a touch screen and a processor configured to display a first portion of an object on the touch screen to correspond to a screen region of the touch screen, display, when the first user input is detected via the touch screen while the first portion is displayed a second portion of the object subsequent to the first portion on the touch screen according to the same direction as a direction of a first user input that satisfies a designated condition, and display, when the second user input is detected via the touch screen while the first portion is displayed, a third portion of the object on the touch screen designated regardless of a direction of a second user input that does not satisfy a designated condition.

In accordance with still another embodiment, there is provided a method of operating an electronic device. The method includes displaying a first object among a plurality of sequentially arranged objects on a touch screen of the electronic device; detecting a user input via the touch screen while the first object is displayed; and displaying a second object arranged subsequent to the first object according to an arrangement order among the plurality of objects on the touch screen when the detected user input is a first user input that satisfies a designated condition, and displaying a third object designated regardless of the arrangement order among the plurality of objects on the touch screen when the detected user input is a second user input that does not satisfy the designated condition.

In accordance with yet another embodiment, there is provided a non-transitory computer-readable recording medium having instructions stored thereon, which when executed cause a processor to perform a method that includes displaying, by the processor, a first object among a plurality of sequentially arranged objects on a touch screen, detecting, by the processor, a user input via the touch screen while the first object is displayed, and displaying, by the processor, a second object arranged subsequent to the first object according to an arrangement order among the plurality of objects on the touch screen when the detected user input is a first user input that satisfies a designated condition, and displaying a third object designated regardless of the arrangement order among the plurality of objects on the touch screen when the detected user input is a second user input that does not satisfy the designated condition.

BRIEF DESCRIPTION OF THE DRAWINGS

The above and other aspects, features and advantages of certain embodiments of the disclosure will be more apparent from the following detailed description taken in conjunction with the accompanying drawings, in which:

FIGS. 3A, 3B and 3C are diagrams of an electronic device that displays a plurality of sequentially arranged objects in response to a user input, according to an embodiment;

FIGS. 4A and 4B are diagrams of an electronic device that displays a subsequent object in response to a user input while a last object among a plurality of sequentially arranged objects is displayed, according to an embodiment;

FIGS. 6A, 6B and 6C are diagrams of an electronic device that displays a subsequent object in response to a first user input while a last object among a plurality of sequentially arranged objects is displayed, according to an embodiment;

FIGS. 7A and 7B are diagrams of an electronic device that displays a first object in response to a second user input while a last object among a plurality of sequentially arranged objects is displayed, according to an embodiment;

FIGS. 10A, 10B, 10C and 10D are diagrams of an electronic device that displays any one of a plurality of sequentially arranged objects in response to a user input scenario, according to an embodiment;

FIGS. 11A, 11B 11C and 11D are diagrams of an electronic device that displays any one of a plurality of sequentially arranged objects in response to a user force touch input scenario, according to an embodiment;

DETAILED DESCRIPTION

Figure 1:
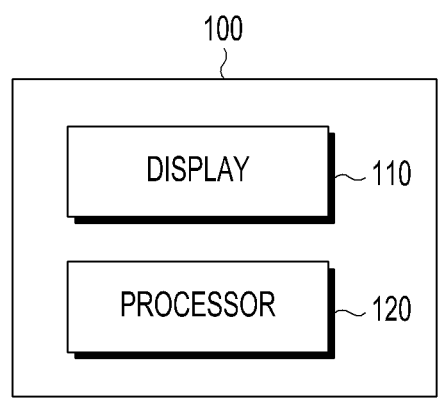
FIG. 1 is a diagram of an electronic device, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things device (IoT) (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" may indicate a person using an electronic device or a device (e.g., an artificial intelligence electronic device) using an electronic device.

As described above, when a plurality of sequentially arranged objects are displayed on a touch screen, an object may be displayed according to an arrangement order in response to a touch input to which a user's intention is reflected, or an object irrelevant to the arrangement order may be displayed. It is possible to induce a touch input to which a user's intention is reflected by displaying a page including an object irrelevant to the arrangement order for more intuitively inducing a user to perform a touch input for a predetermined time, without a control icon on the touch screen.

Therefore, the electronic device described herein makes it is possible to increase the usability thereof such that the electronic device can display the plurality of sequentially arranged objects on the touch screen in response to the touch input to which the user's intention is reflected.

FIG. 1 is a diagram of an electronic device 100, according to an embodiment. The electronic device 100 may include a display 110 and a processor 120. The display 110 and the processor 120 included in the electronic device 100 may be connected to each other through a bus. The bus may include a circuit that transfers communication (e.g., control messages and/or data) between the elements of the electronic device 100.

The display 110 may display various types of content (e.g., text, images, videos, icons, or symbols) for a user. The display 110 may include a liquid crystal display (LCD), a light-emitting diode (LED) display, an organic LED (OLED) display, a microelectromechanical systems (MEMS) display, an electronic paper display, and the like. The display 110 may include a touch screen and may receive touch, gesture, proximity, or hovering input using, for example, an electronic pen or a user's body part.

The processor 120 may include one or more of a CPU, an AP, and a communication processor (CP). The processor 120 may carry out operations or data processing relating to the control and/or communication of at least one other element of the electronic device 100.

All or some of operations performed in the electronic device 100 may be executed by one or more other electronic devices or servers. When the electronic device 100 has to execute any function or service automatically or by request, the electronic device 100 may make a request to other electronic devices (e.g., one or more other electronic devices or server) for at least some of the functions related to the function or service additionally or instead of executing the same by itself. The other electronic devices may execute the requested function or additional function, and may deliver the result thereof to the electronic device 100. The electronic device 100 may provide the requested function or service by processing the received result as is or by additionally processing the same. To this end, cloud computing, distributed computing, or client-server computing technology may be used.

The processor 120 may display a plurality of sequentially arranged objects on the display 110, and may control the display 110 to display any one of the plurality of sequentially arranged objects in response to a user input detected via the display 110.

The processor 120 may display a first object among the plurality of sequentially arranged objects on the display 110. When a first user input that satisfies a designated condition is detected via the display 110 while the first object is displayed, the processor 120 may display, on the display 110, a second object that is arranged subsequent to the first object according to the arrangement order among the plurality of objects. When a second user input that does not satisfy the designated condition via the display 110 while the first object is displayed, the processor 120 may display, on the touch screen, a designated third object regardless of the arrangement order among the plurality of objects.

When a user input is detected within a threshold line designated on the display 110, the processor 120 may determine the detected user input to be the first user input, and when the user input is detected outside the threshold line designated on the display 110, the processor 120 may determine the detected user input to be the second user input. When the first object is an object corresponding to the last object among the plurality of sequentially arranged objects, the processor 120 may display the object corresponding to the last order as the second object on the touch screen. That is, when the first object is the last object, since there is no subsequent object arranged subsequent to the last object, the display of the object corresponding to the last order, which is the first object, may be continuously maintained. In this case, both the first object and the second object may be objects corresponding to the last order.

When the first object is the object corresponding to the last object among the plurality of objects, the processor 120 may display an object corresponding to the first object among the plurality of objects as the third object. That is, when the first object is the last object, the processor 120 may display the object corresponding to the first object among the plurality of objects as the third object in response to the second user input on the display 110. The corresponding order may be moved to the first object at once by displaying the first object on the display 110 in response to the second user input after the last object regardless of the arrangement order among the plurality of sequentially arranged objects. Page looping refers to displaying a plurality of objects in order, one by one, according to a user's touch input when displaying a plurality of ordered objects, and displaying them sequentially after the first object when the corresponding order reaches the last object. Conversely, when page looping is not supported, the last object is retained and displayed despite the user's touch input when the corresponding order reaches the last object. Whether page looping is applied has the effect that page looping can be selectively enabled once depending on whether a user input satisfies a designated condition in a state where page looping is not fundamentally supported.

When the first user input satisfying the designated condition is detected, the processor 120 according to various embodiments may display a portion of the third object up to a predetermined reference line of the touch screen for a designated time and then display the second object on the touch screen. When the first user input is detected while the last object among the plurality of sequentially arranged objects is displayed, the first object may be displayed for 0.3 seconds up to the reference line located at a portion of the right side of the display 110, and then the third object, which is the last object, may be displayed in the entire region of the display 110.

The processor 120 may detect any one of a touch input, a drag input, a scrolling input, a flick input, a swipe input, and a force touch input detected on the display 110 as a user input. The processor 120 may use a designated condition for each of the touch input, the drag input, the scrolling input, the flick input, the swipe input, and the force touch input in order to determine the detected user input to be the first user input or the second user input. Alternatively, the designated condition may be configured differently according to various criteria such as an input distance of a touch input, an input retention time, a difference between the occurrence time of a touch input and the occurrence time of a previously detected touch input, the number of touch inputs, and the like, even for the same touch input. The designated condition may be configured to reflect the usage habit of a specific user, and the designated condition configured in advance may be updated using the statistical value of the cumulative user inputs.

As to the condition designated in response to the force touch input (e.g., pressing force of the touch input that is greater than or equal to a predetermined reference) detected on the display 110, the corresponding threshold value may be configured based on various criteria such as a size of the force touch, a position where the force touch occurs, a relative occurrence position of the force touch with respect to a currently displayed first object, a difference with values (size, position, retention time, etc.) of the previously occurring force touch, and the like.

When a user input is detected within a designated threshold value for a touch input distance on the touch screen, the processor 120 may determine the detected user input to be the first user input, and when the user input is detected outside the designated threshold value for the touch input distance on the touch screen, the processor 120 may determine the detected user input to be the second user input.

When a difference between a distance of the user input detected on the touch screen and a distance of a previously detected user input exceeds (or is greater than) a designated threshold value, the processor 120 may determine the corresponding detected user input to be the second user input, and when the difference between the distance of the user input detected on the touch screen and the distance of the previously detected user input is less than or equal to the designated threshold value, the processor 120 may determine the corresponding detected user input to be the first user input. For example, the detected user input may be classified into a first user input or a second user input by applying a designated condition for the distance of a touch input to a plurality of sequentially arranged home screens. Alternatively, the detected user input may be classified into a first user input or a second user input by applying a designated condition for a scrolling direction and speed to screens displaying sequentially arranged text messages.

When the cumulative number of user inputs detected on the touch screen exceeds a designated threshold value, the processor 120 may determine the corresponding detected user input to be the second user input, and when the cumulative number of user inputs detected on the touch screen is less than or equal to the designated threshold value, the processor 120 may determine the corresponding detected user input to be the first user input.

When the plurality of sequentially arranged objects which is displayed on the touch screen is changed, the processor 120 may initialize the cumulative number of user inputs.

When the size of the user force touch detected on the touch screen is less than or equal to a designated threshold value, the processor 120 may determine the corresponding detected user input to be the first user input, and when the size of the user force touch detected on the touch screen exceeds the designated threshold value, the processor 120 may determine the corresponding detected user input to be the second user input.

When a difference between the occurrence time of a user input detected on the touch screen and the occurrence time of a previously detected user input is less than or equal to a designated threshold value, the processor 120 may determine the corresponding detected user input to be the second user input, and when the difference between the occurrence time of the user input detected on the touch screen and the occurrence time of the previously detected user input exceeds the designated threshold value, the processor 120 may determine the corresponding detected user input to be the first user input.

When the speed of the user input detected on the touch screen exceeds a designated threshold value, the processor 120 may determine the corresponding user input to be the second user input, and when the speed of the user input detected on the touch screen is less than or equal to the designated threshold value, the processor 120 may determine the corresponding detected user input to be the first user input.

When a time during which the user input detected on the touch screen is retained exceeds a designated threshold value, the processor 120 may determine the corresponding detected user input to be the second user input, and when the time during which the user input detected on the touch screen is retained is less than or equal to the designated threshold value, the processor 120 may determine the corresponding detected user input to be the first user input.

When there is reference information on one or more objects for a plurality of sequentially arranged objects, the processor 120 may configure, as the third object, an object designated regardless of the arrangement order among the one or more objects on which the reference information exists, or may configure the second object according to the arrangement order among the one or more objects on which the reference information exists. The reference information may be created, modified, and deleted by a user, and may be provided in various forms such as preference information such as "like it", favorite information, bookmark information, and the like. The reference information may include various types of information such as a generation time, a generated user information, a recently modified time, a deleted record, score information of preference information, user access information, SNS (e.g., among the plurality of objects, the objects uploaded to the SNS can be displayed), which is an easy document creator, upload information, short messaging service (SMS) transmission information, SMS reception information, and the like.

Figure 2:
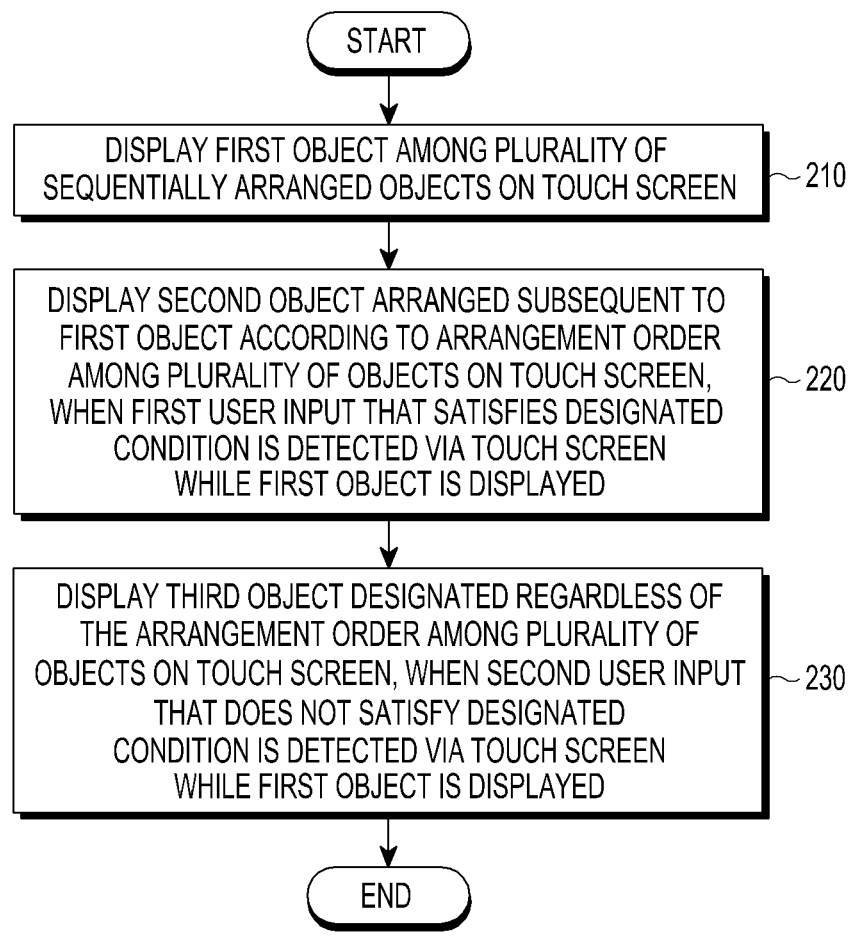
FIG. 2 is a flowchart of a method of operating an electronic device, according to an embodiment.

FIG. 2 is a flowchart of a method of operating an electronic device, according to an embodiment.

In step 210, the electronic device 100 (or the processor 120) may display a first object among a plurality of sequentially arranged objects on a touch screen. The plurality of sequentially arranged objects may be may be discretely displayed one by one on the touch screen. Conversely, a single object among the plurality of sequentially arranged objects may be continuously displayed on the touch screen. That is, a portion of the single object may be displayed in a substantially whole region of the touch screen, and the corresponding screen may be moved to the portion of the single object according to a user input, in response to a scrolling input and may be displayed.

One object that is discretely displayed on the touch screen may mean that one object is displayed in a substantially whole region of the touch screen. Conversely, one object that is continuously on the touch screen may mean that a portion of the object is displayed on the entire region of the touch screen. For example, a photo object may be discretely displayed on the touch screen, and a web page may be continuously displayed on the touch screen. Conversely, when the photo object is enlarged according to the size thereof, only a portion of one photo object may be displayed in a substantially whole region on the touch screen, or the web page may be displayed within the substantial entire region of the touch screen. Objects that are discretely arranged on the touch screen may be represented as a plurality of sequentially arranged objects, and objects that are continuously arranged on the touch screen may be represented as a contiguous portion of the object.

The electronic device 100 may arrange objects in various ways according to screen settings including the screen size of the touch screen, and the like. As to the object displayed on the touch screen, one object selected among the plurality of objects may be displayed on a substantially whole region of the touch screen.

In step 220, the electronic device 100 may detect a user input via the touch screen while the first object is displayed on the touch screen. The user input may be a touch input, a drag input, a flick input, a scrolling input, a force touch input, or the like. The type of the user input may be selected according to the objects arranged in the order including the currently displayed first object and the characteristics of the currently executed application.

In step 230, the electronic device 100 may select any one of a second object that is arranged subsequent to the first object according to the arrangement order among the plurality of sequentially arranged objects and a third object that is designated among the plurality of objects, according to the detected user input in place of the first object displayed on the touch screen, and may display the selected object on the touch screen. Unlike the second object, the third object may be designated regardless of the arrangement order.

When any one of the first object, the second object, and the third object is displayed on the touch screen, another object other than the displayed object may not be displayed on a substantially whole region of the touch screen. Alternatively, the displayed object may be highlighted on the substantially whole region of the touch screen, and the other object other than the displayed object may be displayed without being highlighted relative to the displayed object. Accordingly, a user may recognize the currently displayed object as a main object.

The arrangement order of the plurality of sequentially arranged objects may be designated by various criteria, order information on the plurality of objects may be dynamically updated according to a designated criterion, and the designated criterion itself may be modified or updated. A contact object included in a phone book may be arranged in alphabetical order with respect to names among components of the contact object, or may be arranged on a recently used time basis. The arrangement order may be designated in ascending or descending order, latest order, oldest order, and the like. The arrangement criterion and the sequential criterion may be changed according to user settings.

When the arrangement criterion is different for the same plurality of objects, another object may be designated as the second object arranged subsequent to the first object according to the arrangement criterion, and even when the arrangement criterion is the same, another object may be differently designated as the second object arranged subsequent to the first object according to the arrangement order.

When an object corresponding to the last object among the plurality of sequentially arranged objects is displayed as the first object on the touch screen, the second object may be an object before the last order, and may be an object corresponding to the subsequent order of the first object. When there is no object corresponding to the subsequent order of the last object, the first object and the second object may be the same object corresponding to the last order. The third object is designated regardless of the arrangement order, and may be designated by a user or an administrator of the electronic device regardless of the arrangement criterion or the arrangement order. When the first object is the object corresponding to the last order, the third object may be an object corresponding to the first order.

When there is reference information on one or more objects among the plurality of sequentially arranged objects, the second object and/or the third object may be selected by reflecting the reference information. For example, as to 100 photo sequentially arranged objects, when preference information "like it" of a user exits in 36 objects, the second object may be an object corresponding to the subsequent order according to the arrangement order of the currently displayed first object. In this instance, the second object may be an object having no preference information "like it". Alternatively, the third object may be an object that is positioned at the beginning in the arrangement order among the 36 objects having the preference information "like it". Alternatively, an object to which the preference information "like it" is most recently referred may be the third object. A method of designating the third object among the plurality of objects having the reference information may be implemented in various manners.

FIGS. 3A, 3B and 3C are diagrams of the electronic device 100 that displays a plurality of sequentially arranged objects in response to a user input, according to an embodiment. FIGS. 3A, 3B, and 3C illustrate home screen screens of the electronic device 100. FIG. 3A is a first home screen 310 among a total of three home screens 310, 320, and 330, FIG. 3B is a second home screen 320 among the home screens, and FIG. 3C is a last or third home screen 330. The home screens 310, 320, and 330 may be displayed one by one on a substantially whole region of the touch screen. In FIG. 3A, a widget for weather information is arranged on the left side of the touch screen, an Internet searchable search bar is arranged at the top of the touch screen, and a clock app, a calendar app, a gallery app, and a camera app are arranged on the right side of the touch screen. In FIG. 3B, six apps including a shared app, a digital multi-media broadcasting (DMB) app, a calculator app, a font app, a music app, and a contact app are sequentially arranged at the top of the screen. In FIG. 3C, four apps including a recording app, a memo app, a map app, and a store app are sequentially arranged at the top of the screen.

In FIG. 3A, when a user input 340 is detected as a touch input of a predetermined length, the second home screen 320, which is the next home screen, may be displayed as shown in FIG. 3B. In FIG. 3B, when a user input 350 is detected, the last home screen 330, which is the third home screen 330 corresponding to the subsequent order of the second home screen 320, may be displayed. The two user inputs 340 and 350 are the same touch input and predetermined lengths of the touch inputs are substantially the same.

When a first user input is detected, the electronic device 100 may sequentially change and display the objects according to the arrangement order as shown in FIGS. 3A-3C. The user input 340 and the user input 350 may be determined to be the first user input when the designated condition is satisfied. Here, when the home screen currently displayed in FIG. 3A is the first home screen 310, the home screen 320 corresponding to the subsequent order may be displayed as the second object as shown in FIG. 3B, and when the home screen currently displayed in FIG. 3B is the second home screen 320, the home screen 330 corresponding to the subsequent order may be displayed as the second object as shown in FIG. 3C.

FIGS. 4A and 4B are diagrams of the electronic device 100 that displays a subsequent object in response to a user input while a last object among a plurality of sequentially arranged objects according to an embodiment is displayed. A home screen 420 corresponding to the last order again may be displayed in response to a user input 430 detected in FIG. 4A in which a home screen 410 corresponding to the last home screen among a plurality of home screens is displayed.

In the home screen 420, displaying the last home screen corresponds to a case in which a user input satisfies a determined condition, but there is no home screen corresponding to the subsequent order in the arrangement order. Accordingly, the home screen 420 corresponding to the last order may be displayed as shown in FIG. 4B. In FIGS. 4A and 4B, the home screen 410 and the home screen 420 are the same.

Figure 5:
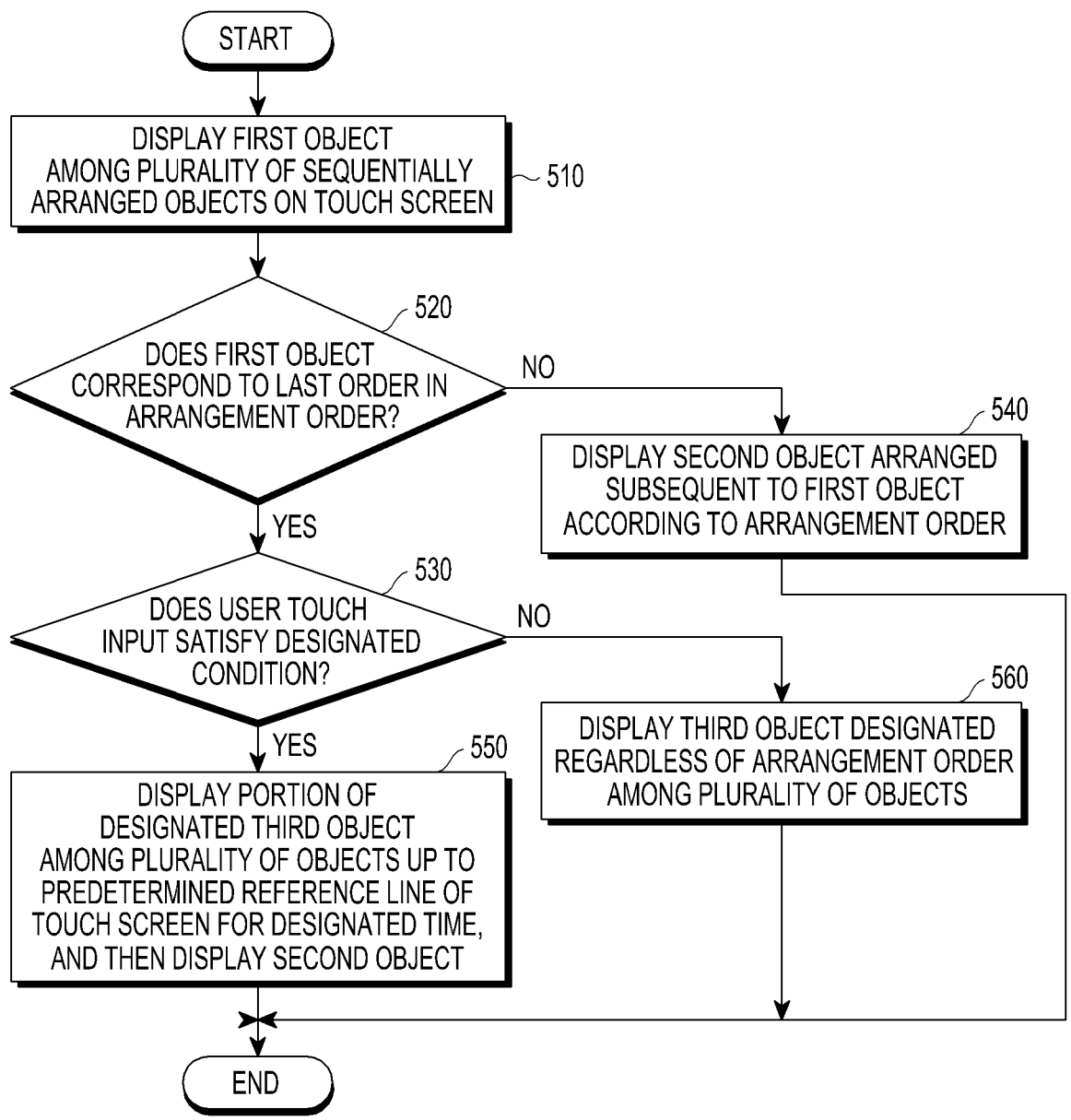
FIG. 5 is a flowchart of a method of operating an electronic device that displays a plurality of sequentially arranged objects, according to an embodiment.

FIG. 5 is a flowchart of a method of operating the electronic device 100 that displays a plurality of sequentially arranged objects, according to an embodiment.

In step 510, the electronic device 100 (or the processor 120) may display a first object among a plurality of sequentially arranged objects on the display 110. Each of the plurality of sequentially arranged objects may be discretely displayed on the touch screen. The first object may be an arbitrary object selected from the plurality of sequentially arranged objects.

In step 520, the electronic device 100 may determine whether the first object displayed on the display 110 is an object corresponding to the last order in the arrangement order among the plurality of sequentially arranged objects. When the first object is the object corresponding to the last order in the arrangement order based on the determination result, the corresponding procedure may proceed to step 530. When the first object is not the object corresponding to the last order in the arrangement order based on the determination result, the corresponding procedure may proceed to step 540.

In step 530, whether the detected user input satisfies a designated condition may be determined. For example, the electronic device 100 may determine whether an input distance of the touch input satisfies a threshold value set at a designated condition. Alternatively, the electronic device 100 may determine whether the retention time of the touch input satisfies a threshold value set at a designated condition. When the detected user input is less than or equal to the threshold value based on the determination result, the corresponding procedure may proceed to step 550, and when the detected user input exceeds the threshold value, the corresponding procedure may proceed to step 560.

In step 540, the electronic device 100 may display a second object that is arranged consecutively to the first object according to the arrangement order, on the display 110. For example, when the first object corresponds to a 20th object among 100 sequentially arranged objects, a 21st object may be displayed as the second object. The arrangement order may be designated differently depending on the characteristics of the plurality of objects.

In step 550, the electronic device 100 may display a portion of a designated third object among the plurality of objects on a portion of the display 110 and then display the first object on the touch screen. A portion of the third object may be displayed up to a predetermined reference line of the display 110 for a designated time, and the first object may be displayed again in a substantially whole region of the display 110. The third object may be an object corresponding to the first object among the plurality of sequentially arranged objects. The third object corresponding to the first order may be displayed on a portion of the touch screen for a short time, and the previously displayed first object corresponding to the last order may be displayed again. By notifying a user that the displayed first object is the last object and exposing a portion of the first object for a while, it is possible to induce the user to perform a touch input different from the currently input touch input when the user desires to move to the first object.

In step 560, the electronic device 100 may display the designated third object among the plurality of objects. When it is determined that the user input detected in a state where the first object corresponding to the last object among the plurality of sequentially arranged objects is displayed on the touch screen does not satisfy the designated condition, the designated third object among the plurality of objects regardless of the arrangement order. The third object may be an object corresponding to the first object among the plurality of sequentially arranged objects, may be an object that has been accessed most recently among the plurality of sequentially arranged objects, or may be an object in which reference information is recorded by a user. A method of designating the third object may be determined using various methods. Furthermore, although the third object is designated irrespective of the arrangement order, a designated criterion may be configured by reflecting characteristics of the plurality of sequentially arranged objects.

FIGS. 6A, 6B and 6C are diagrams of the electronic device 100 that displays a subsequent object in response to a first user input while a last object among a plurality of sequentially arranged objects is displayed, according to an embodiment. Referring to FIG. 5, a last home screen 610 among home screens may be displayed according to step 510, as shown in FIG. 6A.

When the home screen of FIG. 6A corresponds to the last order of the home screen, the corresponding procedure proceeds from step 520 of FIG. 5 to step 530, based on whether a user input 640 detected in FIG. 6A satisfies the designated condition may be determined in step 530. For example, when an input length of the user input 640 is less than or equal to the threshold value according to the designated condition, the corresponding procedure may proceed to step 550.

When the last home screen 610 is displayed on the touch screen, the home screen 650 corresponding to the first order, as the third object that is overlapped and designated in a state in which the last home screen 620 is displayed as shown in FIG. 6B in response to the user input 640, may be displayed up to a designated reference line 601 of the touch screen for a designated time.

The home screen 620 is displayed as shown in FIG. 6B, and then the home screen 630 which is the last home screen may be displayed again on the touch screen because the second object arranged in connection with the first object in the arrangement order does not exist, as the second object again as shown in FIG. 6C.

FIGS. 7A and 7B are diagrams of the electronic device 100 that displays a first object in response to a second user input while a last object among a plurality of sequentially arranged objects according to an embodiment is displayed. Referring again to FIG. 5, a last home screen 710 among home screens may be displayed according to step 510 as shown in FIG. 7A, and a user input 730 may be input. When a currently displayed object corresponds to the last object in the arrangement order and the input user input 730 does not satisfy a designated condition, a home screen 720 as a designated third object among the plurality of objects may be displayed on the touch screen according to step 560 as shown in FIG. 7B. The third object may be the first home screen 720 corresponding to the first order in the arrangement order. When page looping is applied or not applied will be described with respect to FIGS. 7A and 7B. In an exceptional case in which page looping is fundamentally not supported but a user input does not satisfy a designated condition, the corresponding user input is regarded as a user input in which user's intention (that is, the intention to contradict that the page looping is not supported) is reflected, so that page looping is selectively supported.

In various embodiments, a condition that is designated to determine the detected user input to be a first user input or a second user input may be configured, which will be described with reference to FIGS. 8A, 8B, 9A and 9B.

Figure 8A:
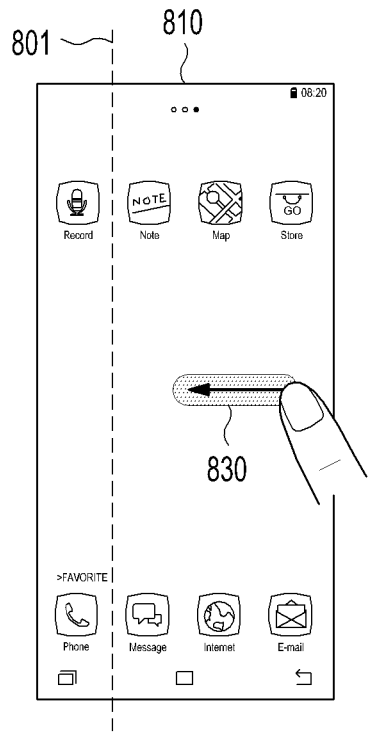
FIGS. 8A and 8B are diagrams of an electronic device that illustrates a threshold range for a user input, according to an embodiment.
Figure 8B:
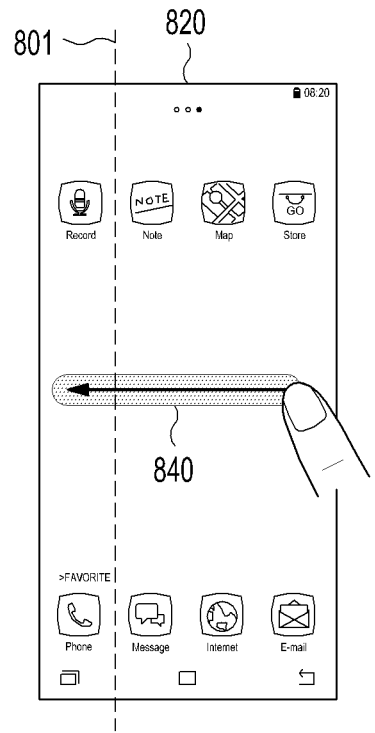

FIGS. 8A and 8B are diagrams of the electronic device 100 that illustrates a threshold range for a user input, according to an embodiment. When a user input 830 is detected within a threshold line 801 with respect to the threshold line 801 for the touch screen as shown in FIG. 8A, the detected user input 830 may be determined to be a first user input.

When the detected user input 840 is detected outside the designated threshold line 801 as shown in FIG. 8B, the detected user input 840 may be determined to be the second user input. The user inputs 830 or 840 detected with respect to a physical reference line may be classified into the first user input or the second user input based on the touch screen. The threshold line 801 may be configured in relation to the entire regions 810 and 820 displayed substantially on the touch screen, and an object currently displayed on the touch screen among a plurality of sequentially arranged objects may be displayed as a whole to correspond to the entire regions. For example, the threshold line 801 may be configured at the boundary of the region corresponding to 90% of the entire region that is substantially displayed. In FIGS. 8A and 8B, it may be determined whether the touch input satisfies a threshold value (designated condition) with respect to the threshold line 801 on the touch screen, regardless of a point at which the touch input is started and an input distance of the touch input.

The threshold line 801 may be determined with respect to a region where the touch input is mainly detected due to the touch input habit of a specific user among the entire region substantially displayed on the touch screen by reflecting the touch input habit of the specific user on the touch screen. It may be determined that the corresponding user input does not satisfy the designated condition (threshold value) when the touch input is detected up to a region where the touch input is not mainly input unlike the touch input which a user mainly inputs.

Figure 9A:
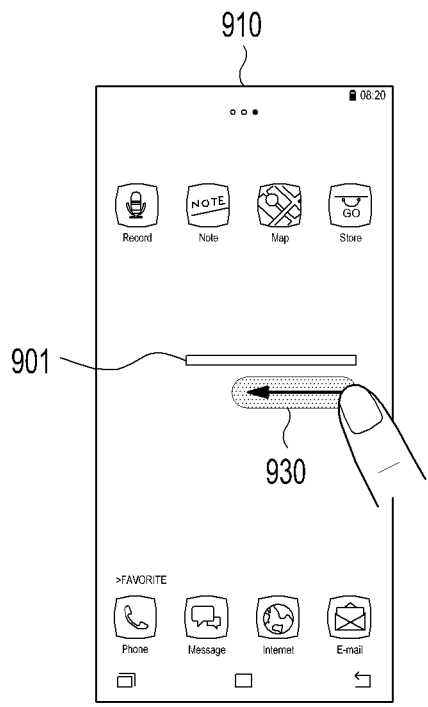
FIGS. 9A and 9B are diagrams of an electronic device that illustrates a user-adapted threshold range for a user input, according to an embodiment.
Figure 9B:
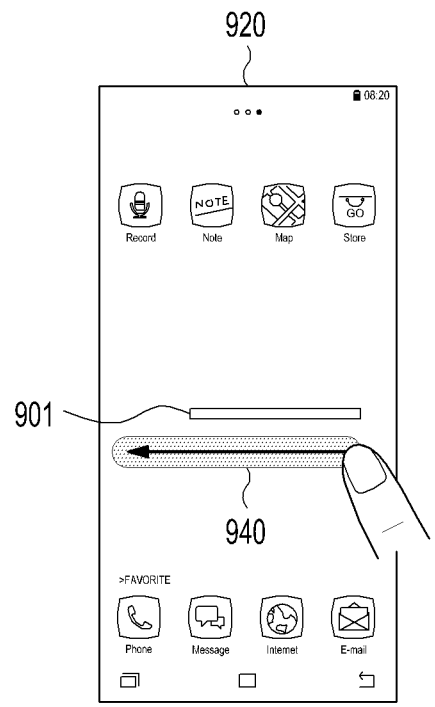

FIGS. 9A and 9B are diagrams of the electronic device 100 that illustrates a user-adapted threshold range for a user input, according to an embodiment. A threshold value 901 may be set as a designated condition for a distance of a user input based on a point at which the user input is started on the touch screen. In FIG. 9A, a user input 930 is detected within the threshold value 901 for the distance of the touch input. In FIG. 9B, the user input 940 is detected to exceed the threshold value 901 for the touch input.

The threshold value 901 for the distance of the touch input may be designated as a statistical value for the length of a general touch input, or may be designated as a statistical value of the distance values of the touch inputs previously input to the touch screen by reflecting the habit of a specific user. Alternatively, the distance of the previously input touch input of the same user may be dynamically updated by the threshold value 901 for the distance of the touch input.

Unlike the physical threshold line of the entire region substantially displayed on the touch screen in FIGS. 8A and 8B, in FIGS. 9A and 9B, the user input is determined based on the designated condition for the distance of the detected touch input has been described.

FIGS. 10A, 10B, 10C and 10D are diagrams of the electronic device 100 that displays any one of a plurality of sequentially arranged objects in response to a user input scenario, according to an embodiment. Referring again to FIG. 5, in step 510, the last object among the sequentially arranged three objects (home screens) is displayed as shown in FIG. 10A. Since the displayed object is an object corresponding to the last order in step 520, the corresponding procedure may proceed to step 530. In step 530, a user input 1050 detected in FIG. 10A satisfies a designated condition, and thus the corresponding procedure may proceed to step 550.

In step 550, the third object designated among the plurality of objects, for example, a home screen 1020 corresponding to the first order, may be displayed for a designated time as shown in FIG. 10B. The home screen 1020 corresponding to the first order is displayed for the designated time as shown in FIG. 10B, and a home screen 1030 corresponding to the last order may be displayed again as the second object because there is no object subsequent to the last object in the arrangement order.

A user input 1060 may be detected while the last home screen 1030 is displayed as shown in FIG. 10C. The home screen 1030 may be displayed in step 510 of FIG. 5, and since the displayed home screen 1030 is the object corresponding to the last order in step 520, the corresponding procedure may proceed to step 530. In step 530, whether the detected user input 1060 satisfies the designated condition is determined. Here, the user input 1060 does not satisfy the designated condition unlike the user input 1050 input in FIG. 10A, and thus, the corresponding procedure may proceed to step 560. In step 560, a home screen 1040 corresponding to the first order as descried in FIG. 10B may be displayed in a substantially whole region on the touch screen as shown in FIG. 10D, as the third object designated among the plurality of objects regardless of the arrangement order.

In FIGS. 10A, 10B, 10C and 10D, when different user inputs 1050 and 1060 are detected while the last home screens 1010 and 1030 are equally displayed, an object to be displayed among the plurality of sequentially arranged objects may be changed. The screens shown in FIGS. 10B and 10C may be consecutively displayed according to the user input 1050, and the screen shown in FIG. 10D may be displayed according to the user input 1060.

FIGS. 11A, 11B, 11C and 11D are diagrams of the electronic device 100 that displays any one of a plurality of sequentially arranged objects in response to a user force touch input scenario, according to an embodiment. Referring to FIG. 5, the user force touch input scenario of FIGS. 11A, 11B, 11C and 11D will be described. In step 510 of FIG. 5, the last home screen among sequentially arranged three objects (home screens) may be displayed as shown in FIG. 11A. In step 520, since the displayed object is an object corresponding to the last order, the corresponding procedure may proceed to step 530. At this time, a circle indicated below a user's finger as a user input 1150 may refer to the magnitude of pressure of the force touch.

Next, in step 530, when the user input 1150 detected in the screen shown in FIG. 11A satisfies a threshold value for the magnitude of the force touch as a designated condition, the corresponding procedure may proceed to step 550. In step 550, a portion 1120 of the home screen corresponding to the first order as the third object designated among the plurality of objects may be displayed for a designated time as shown in FIG. 11B, and a home screen 1130 corresponding to the last order again as the second object may be displayed again on the entire touch screen as shown in FIG. 11C because there is no consecutive object in the arrangement order on the last home screen that is currently displayed.

A user input 1160 may be detected while the last home screen 1130 is displayed as shown in FIG. 11C. A circle indicated below a user's finger as the user input 1160 may refer to the magnitude of pressure of the force touch. Again in step 510 of FIG. 5, the home screen 1130 may be displayed. In step 520, the displayed home screen 1130 is an object corresponding to the last order, and thus the corresponding procedure may proceed to step 530.

In step 530, whether the detected user input 1160 satisfies a threshold value for the magnitude of the force touch as the designated condition may be determined. Here, when the user input 1160 exceeds the threshold value unlike the user input 1150 input in the screen shown in FIG. 11A, the corresponding procedure may proceed to step 560.

In step 560, a home screen 1140 corresponding to the first order as described in FIG. 11B may be displayed in a substantially whole region on the touch screen as shown in FIG. 11D, as the third object designated among the plurality of objects.

Figure 12:
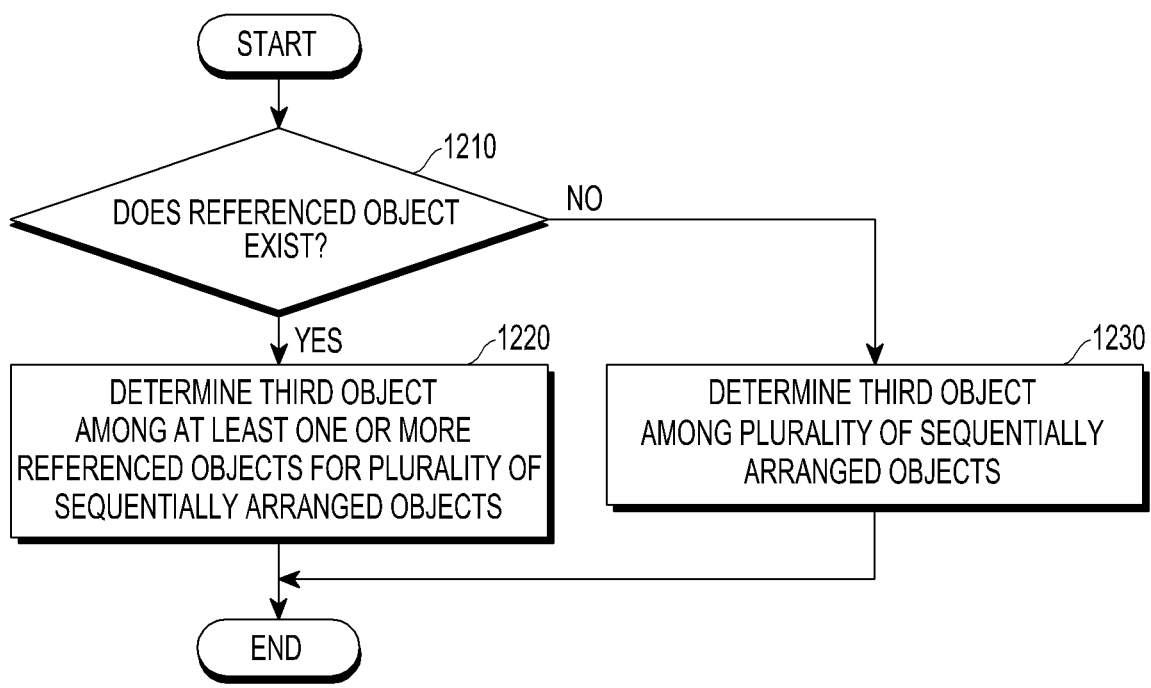
FIG. 12 is a flowchart of a method of operating an electronic device that displays any one of a plurality of sequentially arranged objects in a case in which a referenced object exists, according to an embodiment.

FIG. 12 is a flowchart of a method of operating the electronic device 100 that displays any one of a plurality of sequentially arranged objects when a referenced object exists, according to an embodiments. For a plurality of sequentially arranged objects, reference information may be recorded in a specific object by a user. For example, reference information such as favorites, bookmarks, and the like may be dynamically recorded, modified, or deleted.

In step 1210, the electronic device 100 (or the processor 120) may determine whether there is an object that is referenced for a plurality of sequentially arranged objects. For example, there may be one or more favorite objects among the plurality of sequentially arranged objects. As with the referenced object, referenced time information, referenced user information, referenced and deleted information, and the like may also be recorded.

When there is at least one referenced object among at least one or more sequentially arranged objects, the corresponding procedure may proceed to step 1220; otherwise, the corresponding procedure may proceed to step 1230. According to steps 1220 and 1230, when there is reference information, the reference information may be reflected to determine the third object.

In step 1220, the electronic device 100 may determine the third object among at least one or more referenced objects for the plurality of sequentially arranged objects. The third object may be designated only with respect to the referenced objects, except for the objects which are not referenced among the plurality of sequentially arranged objects. A method of designating the third object may be determined differently according to various methods. For example, the most recently referenced object may be designated as the third object. Alternatively, the referenced object with the earliest arrangement order may be designated as the third object.

In step 1230, the electronic device 100 may determine the third object among the plurality of sequentially arranged objects. Since there is no referenced object, the third object may be determined among the entire plurality of objects without reflecting the reference information.

Figure 13:
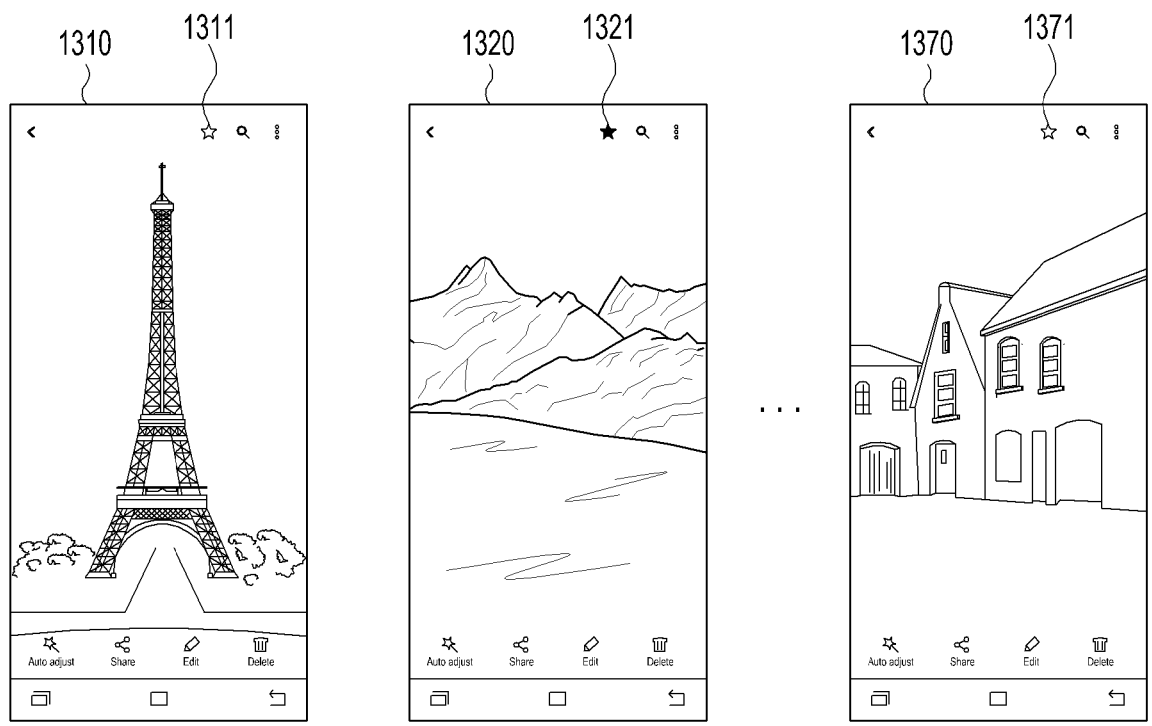
FIG. 13 is a diagram of a plurality of sequentially arranged photo objects, according to an embodiment.

FIG. 13 is a diagram of a plurality of sequentially arranged photo objects, according to an embodiment. It may be assumed that seven photos (1310, 1320, and 1370 are shown and the other four photos are not shown) included in a gallery app are a plurality of objects arranged in the order of generation of the photos. Alternatively, the plurality of photos may be arranged and stored according to the time when they were taken, but may be arranged and stored according to the time when they were modified. Alternatively, the plurality of photos may be arranged and stored according to the place where they were taken. The criteria for arranging the photos contained in the gallery app may be determined differently according to various methods, and the arrangement criteria may be changed dynamically. The arrangement order may also be changed variously, such as in ascending order, descending order, latest order, oldest order, and the like.

The photo object may include various types of detailed information, and may include reference information by reflecting user preferences thereto. For example, in the photo 1310, a favorite icon 1311 is inactivated and reference information by a user does not exist. In the photo 1320, a favorite icon 1321 is activated, and reference information by a user exists. The reference information may include referenced time, time when the reference was modified, referenced user information, and the like. The photo 1370 corresponds to a photo corresponding to the last order of the seven photos. A favorite icon 1371 is inactivated and reference information by a user does not exist.

Figure 14:
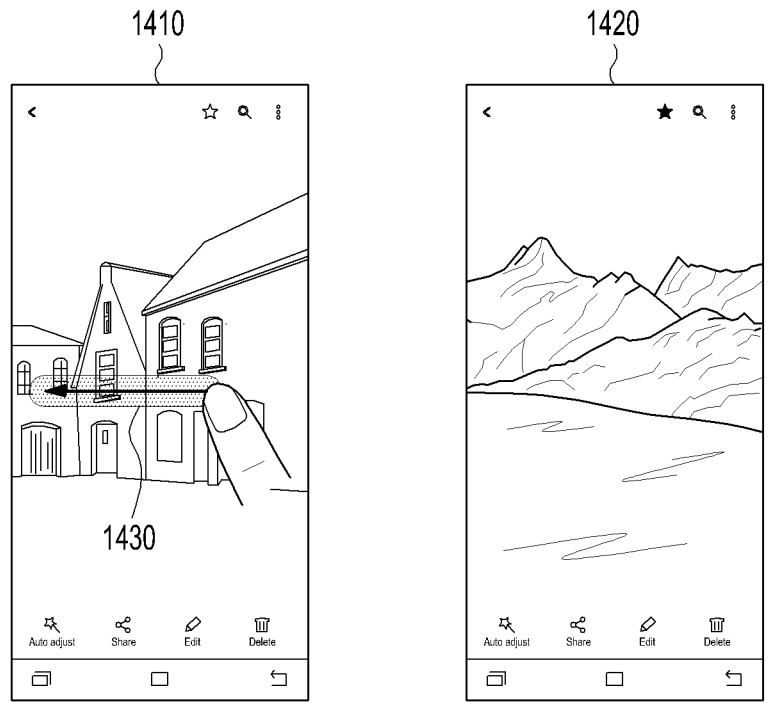
FIG. 14 is a diagram of an electronic device that displays a photo object designated in response to a second user input while a last photo object among a plurality of sequentially arranged photo objects is displayed, according to an embodiment.

FIG. 14 is a diagram of the electronic device 100 that displays a photo object designated in response to a second user input while a last photo object among a plurality of sequentially arranged photo objects is displayed, according to an embodiment. Based on FIG. 12, the seven photo objects arranged in the order of FIG. 13 will be described with reference to FIG. 14.

In step 1210 of FIG. 12, the electronic device 100 may move to step 1220 because an object (e.g., 1320 of FIG. 13) in which favorite information, that is, reference information exists is included in the seven photos of FIG. 13.

In step 1220, the electronic device 100 may display a photo (1320 of FIG. 13) corresponding to the second photo among the seven photos in a substantially whole region on the touch screen as in a photo 1420, as the third object designated among at least one or more reference objects with respect to the plurality of sequentially arranged objects in response to a detected user input 1430 while a last photo is displayed.

Figure 15:
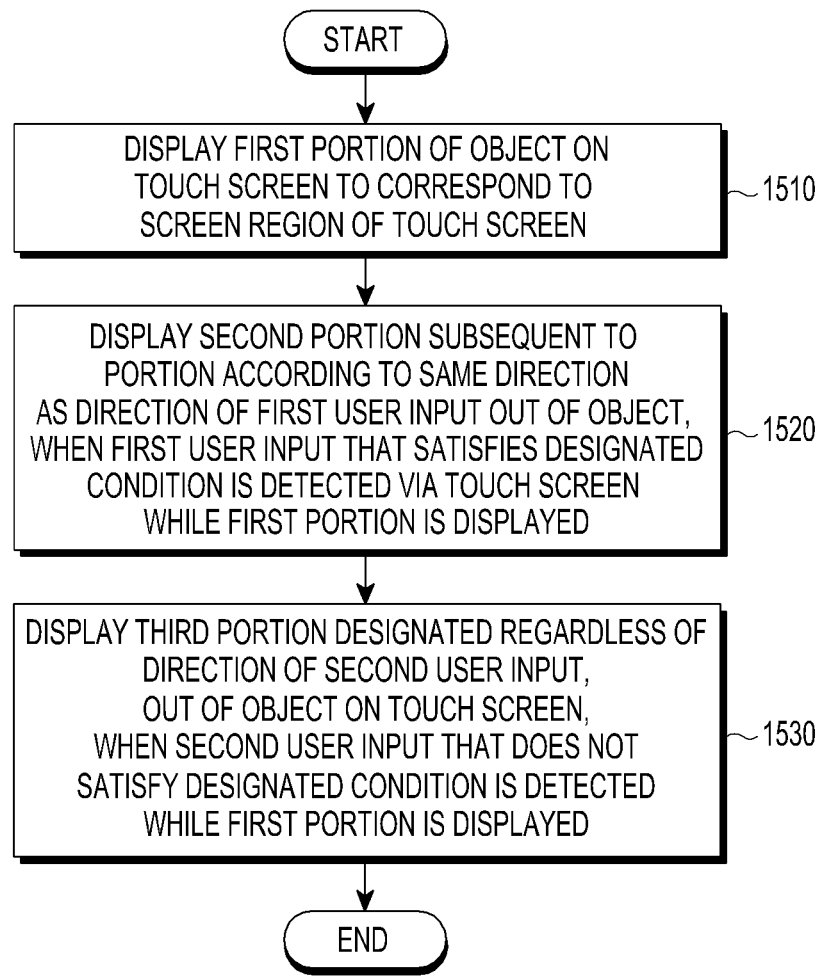
FIG. 15 is a flowchart of a method of operating an electronic device that displays consecutive contents of an object, according to an embodiment.

FIG. 15 is a flowchart of a method of operating the electronic device 100 that displays consecutive contents of an object, according to an embodiment.

In step 1510, the electronic device 100 (or the processor 120) may display a first portion of an object to correspond to a screen region of the touch screen. The screen region of the touch screen may refer to a substantially entire screen on the touch screen. By comparing the size of the entire screen with the size of the object, a selected portion may be displayed on the touch screen as the first portion. When a selected page on a web page is displayed on the touch screen, the next consecutive portion of the object may be sequentially displayed while a user performs scrolling downward in response to a user scrolling input from the beginning of the object. The size of the first portion may be determined to correspond to a region for displaying an object out of the touch screen. Since the first portion refers to a portion of the object, the first portion and the next portion successive to the first portion may be substantially partially overlapped and determined.

In step 1520, the electronic device 100 may detect a user input via the touch screen while the first portion is displayed. The user input may be any one of various types of touch inputs, force touch inputs, flick inputs, scrolling inputs, and swipe inputs.

In step 1530, the electronic device 100 may select any one of a second portion subsequent to the first portion in the same direction as a direction of the detected user input out of the object and a designated third portion of the object according to the detected user input, and may display the selected portion on the touch screen. The object is composed of consecutive contents, and the second portion subsequent to or prior to the first portion in a manner subsequent to the first portion may be selected. That is, the second portion may be determined according to the direction of the detected user input. When a user is viewing a continuous portion of the object while performing scrolling downward, a portion subsequent to the first object corresponding to the same scrolling input may be determined to be the second portion. Alternatively, when a user is viewing a continuous portion of the object while performing scrolling downward, a portion prior to the first object may be determined to be the second portion in response to a scrolling input different from the previous scrolling direction.

The designated third portion of the object may be displayed on the touch screen regardless of the direction of the detected user input. A portion that is moved and located according to the scrolling size of the detected user input, out of the consecutive contents, may be determined to be the third portion, and a portion corresponding to the beginning or the last of the consecutive contents of the object in response to the detected user input scrolling may be determined to be the third portion.

Alternatively, when user reference information exists in at least one portion of the consecutive contents of the object, a portion designated among at least one or more referenced portions may be determined to be the third portion.

The detected user input may be classified into a first user input or a second user input according to a designated condition. At least one of the first user input and the second user input may be a touch input, a scrolling input, a flick input, a swipe input, or a force touch input, and may include an input direction, an input point, an input retention time, information on the pressure (magnitude of pressing force) in the case of the force touch, and the like.

When a time difference between the occurrence time of a touch input and the occurrence time of a previously detected touch input satisfies a threshold value as a designated condition, it may be determined that the first user input is detected. On the other hand, when the time difference between the occurrence time of a touch input and the occurrence time of a previously detected touch input does not satisfy the threshold value, it may be determined that the second user input is detected. For example, when a user performs a touch input at 3-second intervals, with the threshold value being four seconds, and the touch input detected within two seconds, the corresponding user input may be determined to be the first user input. In addition, when the touch input is detected within five seconds, the corresponding user input may be determined to be the second user input. The threshold value as the designated condition may be statistically calculated and set by reflecting user's usage habit.

When the direction of the touch input detected via the touch screen and the direction of the previously detected touch input are the same, it may be determined that the first user input is detected. Otherwise, when the direction of the touch input detected via the touch screen and the direction of the previously detected touch input are different from each other, it may be determined that the second user input is detected. The designated condition may be whether the direction of the touch input detected via the touch screen and the previously input direction are the same.

When the retention time of the touch input detected via the touch screen satisfies a threshold value as a designated condition, it may be determined that the first user input is detected. Otherwise, when the retention time of the touch input detected via the touch screen does not satisfy the threshold value, it may be determined that the second user input is detected.

Figure 16:
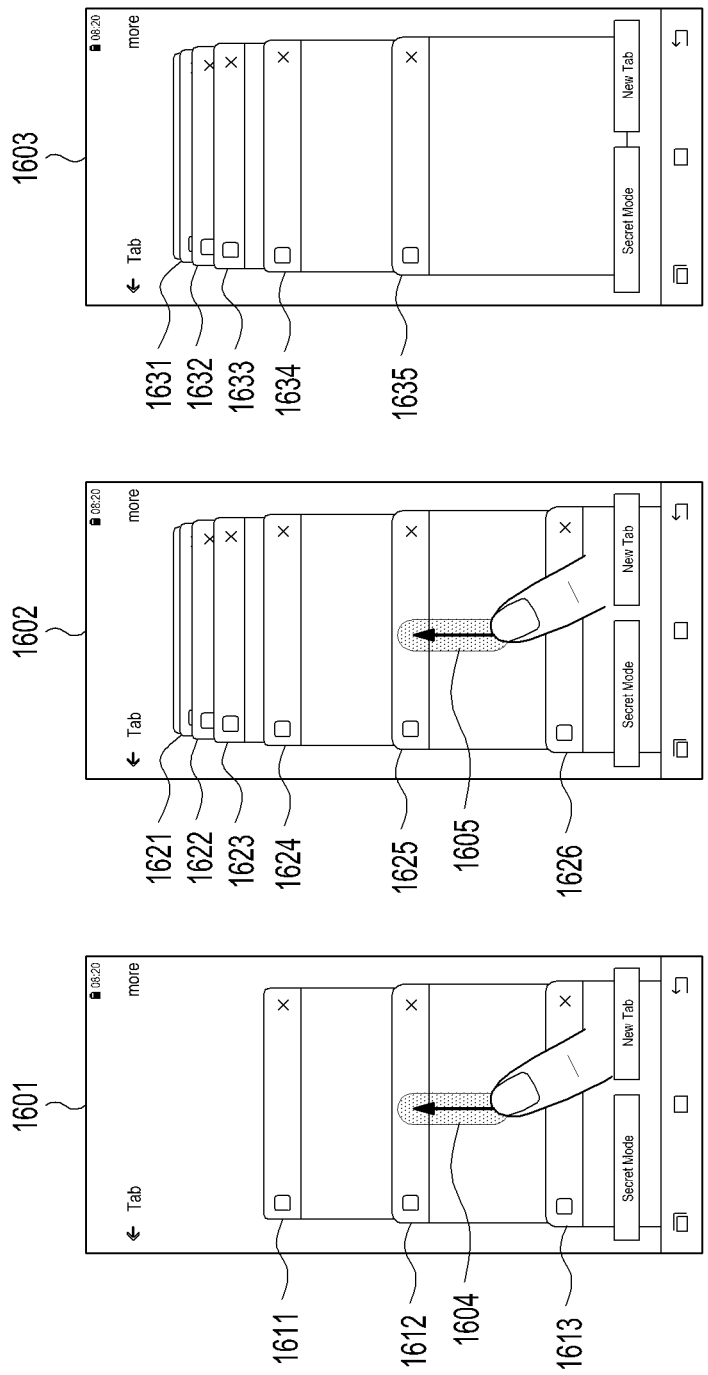
FIG. 16 is a diagram of an electronic device that displays some of consecutive contents of an object in response to a user input, according to an embodiment.

FIG. 16 is a diagram of the electronic device 100 that displays some of consecutive contents of an object in response to a user input, according to an embodiment.

In FIG. 16, the subsequent connection of a plurality of explorer windows in an Internet app may be regarded as an object. For example, 35 explorer windows is one object, and on a screen 1601, a portion of an object including three explorer windows 1611, 1612, and 1613 may be displayed. On a screen 1602, a portion of an object including six explorer windows 1621, 1622, 1623, 1624, 1625, and 1626 may be displayed. On a screen 1603, a portion of an object including five explorer windows 1631, 1632, 1633, 1634, and 1635 may be displayed. The three explorer windows included in the screen 1601, the six explorer windows included in the screen 1602, and the five explorer windows included in the screen 1603 may be regarded as sequential portions existing subsequent to one object. Of these, the explorer window 1611 of the screen 1601 is an explorer window corresponding to the first order, and the explorer window 1635 of the screen 1603 is an explorer window corresponding to the last order.

When a user input 1604 is detected on the screen 1601, it is determined that the designated condition is satisfied, and a second portion including the explorer windows 1621 to 1626 positioned subsequent to a first portion (a region including a first explorer window) of the object displayed on the screen 1601 as in the screen 1602 may be displayed. When a user input 1605 is detected while the second portion of the object is displayed as in the screen 1602, it may be determined that the designated condition is satisfied, and thus a third portion including the explorer windows 1631 to 1635 positioned subsequent to the second portion as in the screen 1603 may be displayed.

Figure 17:
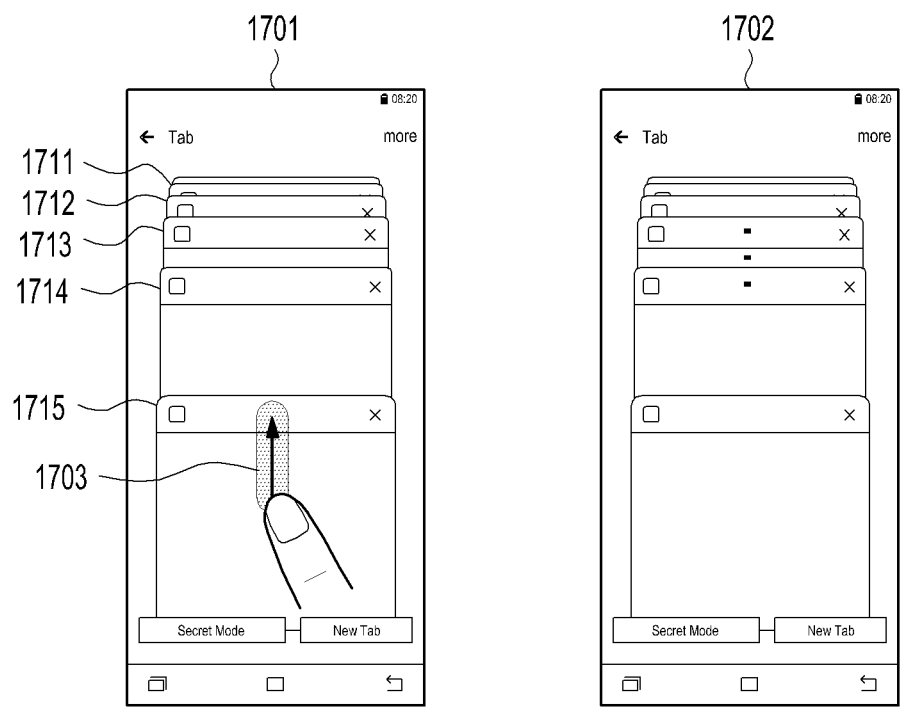
FIG. 17 is a diagram of an electronic device that displays a next portion in response to a first user input while a last portion of consecutive contents of an object is displayed, according to an embodiment.

FIG. 17 is a diagram of the electronic device 100 that displays a next portion in response to a first user input while a last portion of consecutive contents of an object is displayed, according to an embodiment. A screen 1701 of FIG. 17 is illustrated as being the same as the screen 1603 of FIG. 16, and may indicate a last portion (including an explorer window 1715 corresponding to the last order) of an object sequentially including a plurality of explorer windows (1711-1714). When the user input 1703 is detected on a screen 1701, whether the user input 1703 satisfies a designated condition may be determined. When the user input 1703 satisfies the designated condition based on the determination result, a next portion positioned subsequent to a displayed portion of the object may be displayed. Since the screen 1701 corresponds to the last portion of the object, a consecutive next portion in response to the user input 1703 does not exist, so that the same screen 1702 as the screen 1701 may be displayed on the touch screen.

Figure 18:
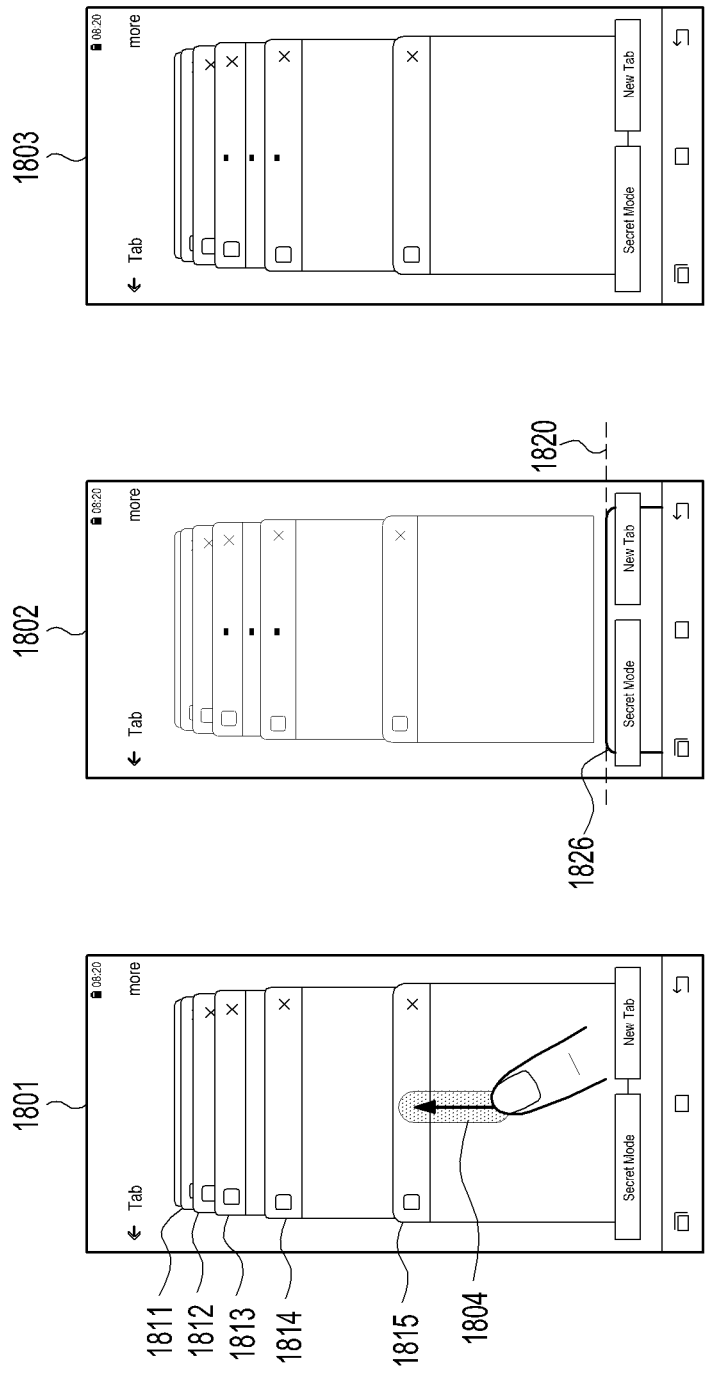
FIG. 18 is a diagram of an electronic device that displays a next portion in response to a first user input while a last portion of consecutive contents of an object is displayed, according to an embodiment.

FIG. 18 is a diagram of the electronic device 100 that displays a next portion in response to a first user input while a last portion of consecutive contents of an object is displayed, according to an embodiment. A screen 1801 of FIG. 18 is illustrated as being the same as the screen 1603 of FIG. 16, and may indicate a last portion (including an explorer window 1815 corresponding to the last order) of an object sequentially including a plurality of explorer windows 1811-1814. When the user input 1804 is detected on a screen 1801, whether the user input 1804 satisfies a designated condition may be determined. When the user input 1804 satisfies the designated condition based on the determination result, a next portion positioned subsequent to a displayed portion of the object may be displayed. Since the screen 1801 corresponds to the last portion of the object, a consecutive next portion in response to the user input 1804 does not exist, so that the same screen 1803 as the screen 1801 may be displayed on the touch screen.

Page looping will be described when the user input 1804 is detected on the screen 1801. When page looping is not supported, a portion including the last portion may be displayed on the touch screen again, and when page looping is supported, a next portion subsequent to the last portion may be regarded as a first portion so that a portion including the first explorer window may be displayed. In FIG. 18, page looping is not supported, and the last portion may be displayed again as in the screen 1803, but when a user intends to move to the first portion, a first portion including a first explorer window of a screen 1826 may be displayed up to a predetermined reference line 1820 on the touch screen for a designated time before the screen 1803 is displayed as in the screen 1802, and the screen 1803 may be displayed again. In this case, it is notified that the screens 1801 and 1803 correspond to the last portion, and when the user intends to move to the first portion, a user input different from the user input 1804 may be induced to be input.

Figure 19:
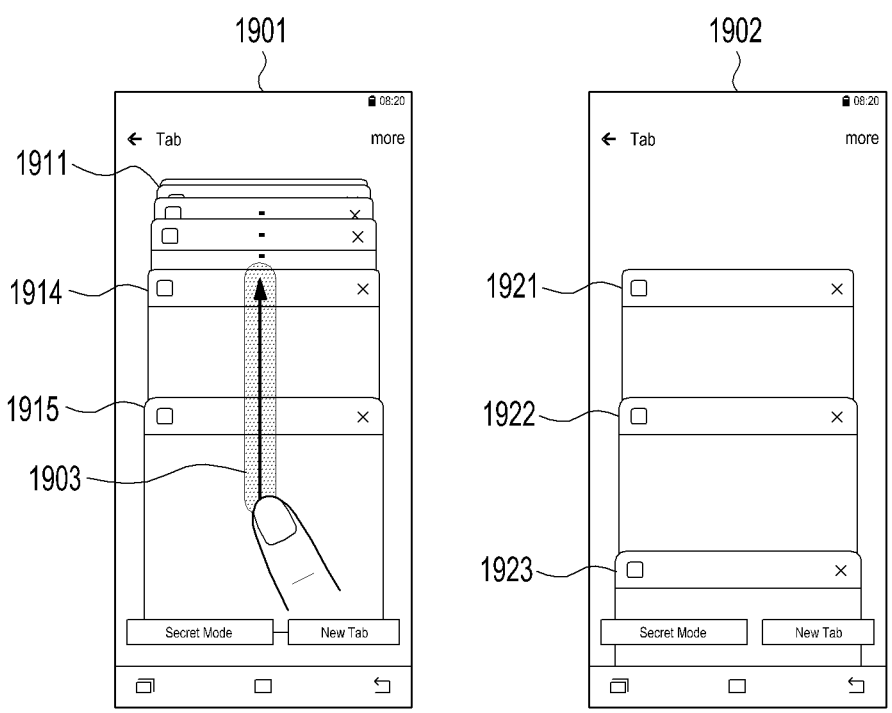
FIG. 19 is a diagram of an electronic device that displays a designated portion in response to a second user input while a last portion of consecutive contents of an object is displayed, according to an embodiment.

FIG. 19 is a diagram of the electronic device 100 that displays a designated portion in response to a second user input while a last portion of consecutive contents of an object is displayed, according to an embodiment. A screen 1901 of FIG. 19 is illustrated as being the same as the screen 1603 of FIG. 16. That is, a last portion including a last explorer window 1915 in one object including a plurality of explorer windows (1911 and 1914) is illustrated.

When a user input 1903 is detected on the screen 1901, whether the user input 1903 satisfies a designated condition may be determined. A case in which the user input 1903 does not satisfy the designated condition based on the determination result may correspond to a case in which page looping is not supported as illustrated in FIG. 18, but page looping may be considered as desired. A screen 1902 may be displayed on the touch screen in response to the user input 1903 detected on the screen 1901. The screen 1902 may indicate a first portion including a first explorer window 1921 among the plurality of explorer windows 1922 and 1923.

Figure 20:
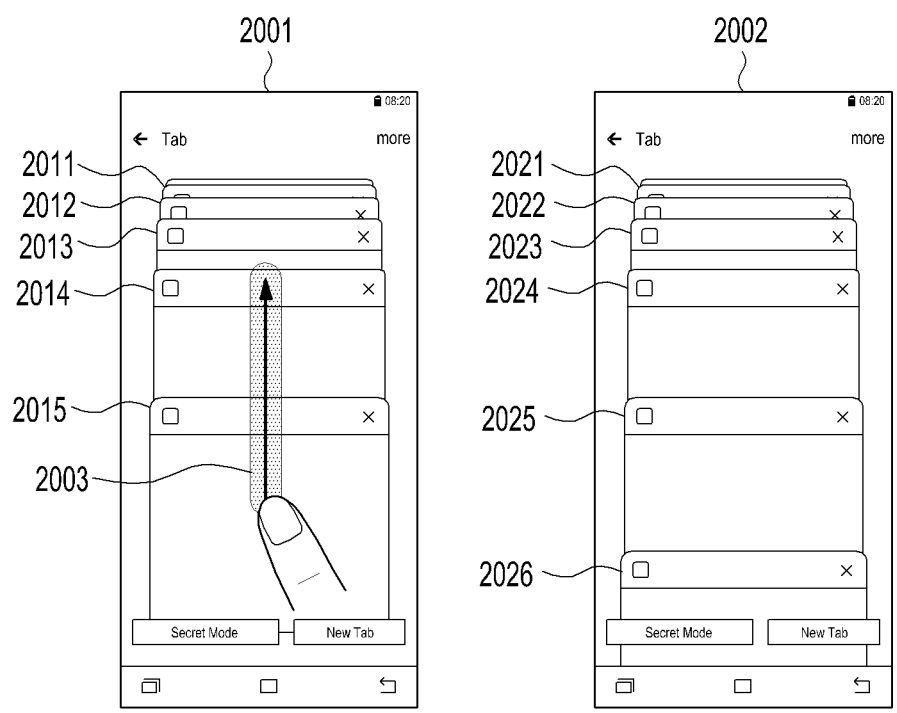
FIG. 20 is a diagram of an electronic device that displays a designated portion in response to a second user input while a last portion of consecutive contents of an object is displayed, according to an embodiment.

FIG. 20 is a diagram of the electronic device 100 that displays a designated portion in response to a second user input while a last portion of consecutive contents of an object is displayed, according to an embodiment. A screen 2001 of FIG. 20 is illustrated as being the same as the screen 1603 of FIG. 16. That is, a last portion including a last explorer window 2015 in one object including a plurality of explorer windows 2011-2014 is illustrated.

When a user input 2003 is detected on the screen 2001, whether the user input 2003 satisfies a designated condition may be determined. The determination result may correspond to a case in which the user input 2003 does not satisfy the designated condition. A screen 2002 may be displayed on the touch screen in response to the user input 2003 detected on the screen 2001. The screen 2002 may be a specific portion designated in the object including a plurality of explorer windows 2021-2026. In FIG. 20, when a previous explorer window 2025 is provided, a portion of an object including the previous explorer window may be displayed in response to the user input 2003 that does not satisfy a designated condition input in a state in which the last portion 2001 is displayed as the designated portion, as in the screen 2002. Criteria for determining the screen 2002, that is, a designated object of the objects may be defined based on various methods. As shown in FIG. 20, an explorer window used immediately before may be determine the designated object.

FIGS. 21A, 21B, 21C, 21D and 21E are diagrams of the electronic device 100 that displays sequentially arranged objects in response to a first user input scenario, according to an embodiment. Any one of a plurality of objects is illustrated as being displayed in consecutively detected user inputs.

Figure 21E:
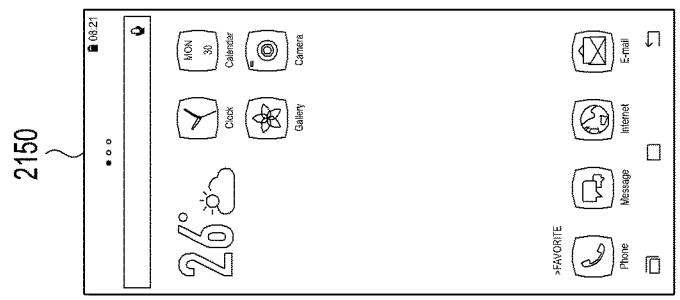
FIGS. 21A, 21B, 21C, 21D and 21E are diagrams of an electronic device that displays sequentially arranged objects in response to a first user input scenario, according to an embodiment.
Figure 21D:
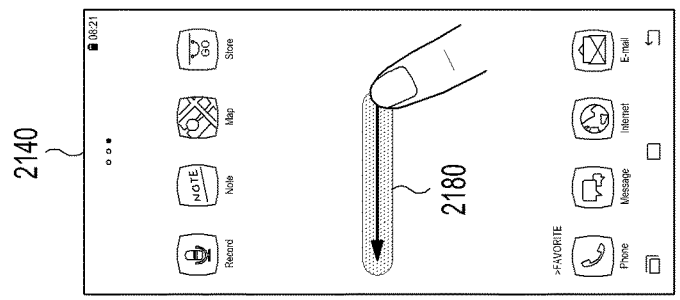
Figure 21C:
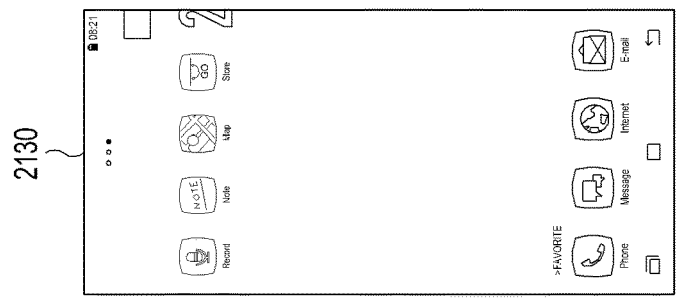
Figure 21B:
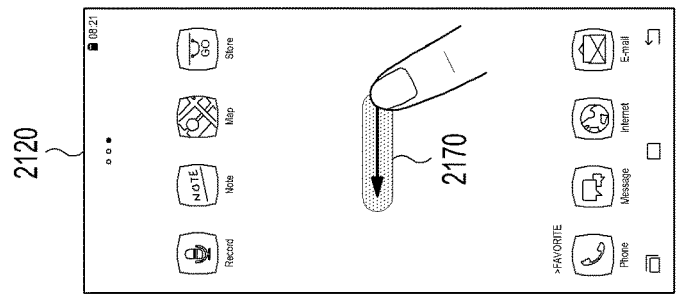

When user inputs 2160, 2170, and 2180 (FIGS. 21A, 21B, and 21D) are respectively detected on screens 2110, 2120, and 2140 will be described. Whether the user input 2160 detected on the screen 2110 satisfies a designated condition may be determined. The user input 2160 may be a drag and release input with a predetermined length. When the user input 2160 satisfies the designated condition based on the determination result, the screen 2120, which is the next screen arranged subsequent to the screen 2110, may be displayed on the touch screen, as shown in FIG. 21B.

Whether the user input 2170 detected on the screen 2120 satisfies the designated condition may be determined. The user input 2170 may be a drag and release input with a predetermined length. When the user input 2170 satisfies the designated condition based on the determination result, but the screen 2120 corresponds to the last object among the plurality of objects, a screen corresponding to the first object among the plurality of objects may be displayed up to a predetermined reference line on the touch screen for a designated time, as shown in FIG. 21C. Because there is no object that is arranged subsequent to the screen 2120, the screen 2140 for the last object which is the same as the screen 2120 may be displayed on the entire region on the touch screen again.

Whether the user input 2180 detected on the screen 2140 satisfies the designated condition may be determined. The user input 2180 may be a drag and release input with a predetermined length. When the user input 2180 does not satisfy the designated condition based on the determination result, an object corresponding to the first order as an object designated among the plurality of objects may be displayed on the entire region on the touch screen as shown in FIG. 21E, as the screen 2150.

FIGS. 22A, 22B, 22C, 22D and 22E are diagrams of an electronic device 100 that displays sequentially arranged objects in response to a second user input scenario, according to an embodiment. Any one of a plurality of objects is illustrated as being displayed in response to consecutively detected user inputs.

Figure 22E:
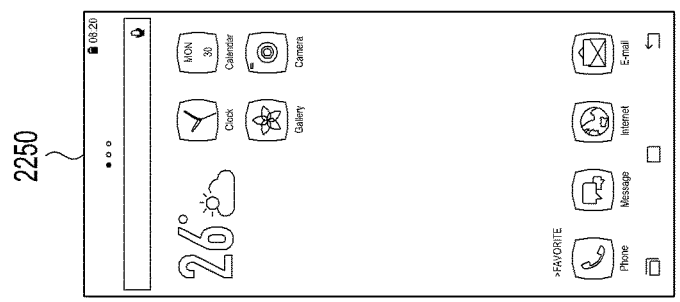
FIGS. 22A, 22B, 22C, 22D and 22E are diagrams of an electronic device that displays sequentially arranged objects in response to a second user input scenario, according to an embodiment.
Figure 22D:
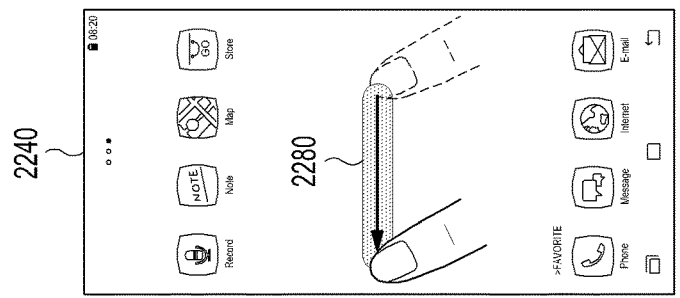
Figure 22C:
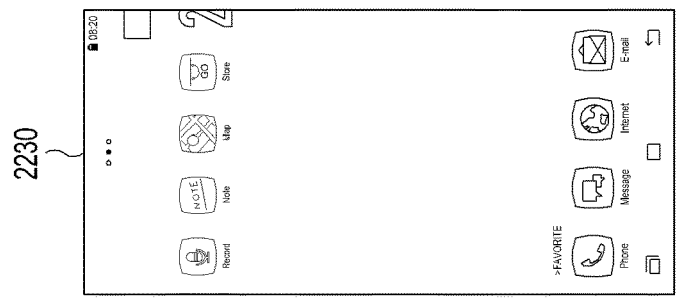
Figure 22B:
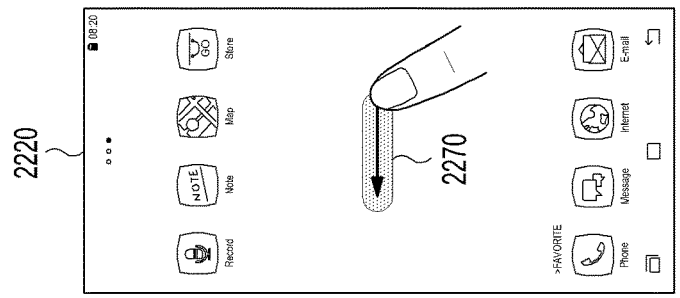
Figure 22A:
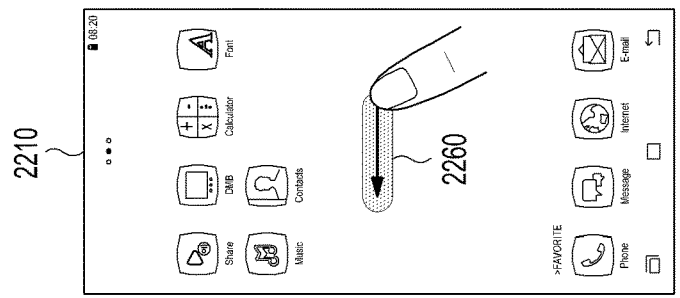

When user inputs 2260, 2270, and 2280 (FIGS. 22A, 22B, and 22D) are respectively detected on screens 2210, 2220, and 2240 will be described. Whether the user input 2260 detected on the screen 2210 satisfies a designated condition may be determined. The user input 2260 may be a drag and release input with a predetermined length. When the user input 2260 satisfies the designated condition based on the determination result, the screen 2220, which is the next screen arranged subsequent to the screen 2210, may be displayed on the entire region on the touch screen, as shown in FIG. 22B.

Whether the user input 2270 detected on the screen 2220 satisfies the designated condition may be determined. The user input 2270 may be a drag and release input with a predetermined length. When the user input 2270 satisfies the designated condition based on the determination result, but the screen 2220 corresponds to the last object among the plurality of objects, a screen corresponding to the first object among the plurality of objects may be displayed up to a predetermined reference line on the touch screen for a designated time, as shown in FIG. 22C. Because there is no object that is arranged subsequent to the screen 2220, the screen 2240 for the last object which is the same as the screen 2220 may be displayed on the entire region on the touch screen again.

Figure 21A:
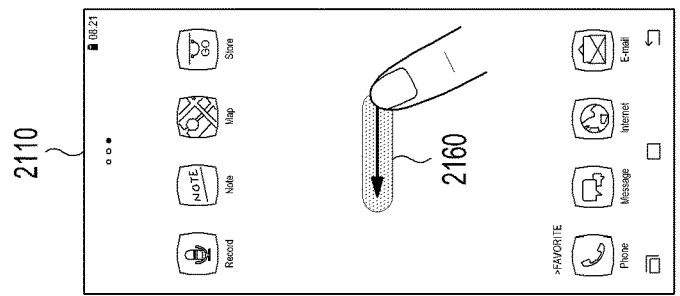

Whether the user input 2280 detected on the screen 2240 satisfies the designated condition may be determined. The user input 2280 may be a drag and release input with a predetermined length. When the user input 2280 does not satisfy the designated condition based on the determination result, an object corresponding to the first order as an object designated among the plurality of objects may be displayed on the entire region on the touch screen as the screen 2250, as shown in FIG. 22E. The user input 2280 may illustrate that the designated time has elapsed without releasing after a drag input, unlike the user input 2180 which is the drag and release input of FIG. 21. In FIGS. 21A and 22E, user inputs may be illustrated as being classified based on different designated conditions when the user inputs are different.

Each of the components of the electronic device 100 may be implemented by one or more components and the name of the corresponding component may vary depending on a type of the electronic device. The electronic device may include at least one of the above-described elements. Some of the above-described elements may be omitted from the electronic device, or the electronic device may further include additional elements. Further, some of the components of the electronic device may be combined to form a single entity, and thus, may equivalently execute functions of the corresponding elements prior to the combination.

At least some of the devices (e.g., modules or functions thereof) or the method (e.g., steps) according to the disclosure may be implemented by a command stored in a non-transitory computer-readable storage medium in a programming module form. When the command is executed by one or more processors, the one or more processors may perform a function corresponding to the command. The non-transitory computer-readable storage medium may be, for example, the memory.

The non-transitory computer readable recoding medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a read only memory (ROM), a random access memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the step(s) of the disclosure, and vice versa.

The programming module may include one or more of the aforementioned components or may further include other additional components, or some of the aforementioned components may be omitted. Operations executed by a module, a programming module, or other component elements may be executed sequentially, in parallel, repeatedly, or in a heuristic manner. Furthermore, some operations may be executed in a different order or may be omitted, or other operations may be added.

In a storage medium that stores instructions, the instructions may be configured to cause the at least one processor to perform at least one operation when they are executed by at least one processor. The at least one operation may include displaying, by the processor, a first object among a plurality of sequentially arranged objects on a touch screen; detecting, by the processor, a user input via the touch screen while the first object is displayed; and displaying, by the processor, a second object arranged subsequent to the first object according to the arrangement order among the plurality of objects on the touch screen when the detected user input is a first user input that satisfies a designated condition, and displaying a third object designated regardless of the arrangement order among the plurality of objects on the touch screen when the detected user input is a second user input that does not satisfy the designated condition.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
a touch screen; and
a processor configured to:
display a first object among a plurality of sequentially arranged objects on the touch screen,
display, when a first user input that satisfies a first condition is detected via the touch screen while the first object is displayed, a second object arranged subsequent to the first object according to an arrangement order among the plurality of objects on the touch screen, and
display, when a second user input that satisfies a second condition is detected via the touch screen while the first object is displayed, a third object designated regardless of the arrangement order among the plurality of objects on the touch screen.

2. The electronic device of claim 1, wherein,
when a user input is detected within a designated threshold line on the touch screen, the processor is further configured to determine the detected user input to be the first user input, and
when the user input is detected outside the designated threshold line on the touch screen, the processor is further configured to determine the detected user input to be the second user input.

3. The electronic device of claim 1, wherein, when the first object is an object corresponding to a last object among the plurality of sequentially arranged objects, the processor is further configured to display the object corresponding to the last order on the touch screen as the second object.

4. The electronic device of claim 3, wherein, when the first user input that satisfies the first condition is detected, the processor is further configured to display a portion of the third object up to a predetermined reference line of the touch screen for a designated time, and then to display the second object on the touch screen.

5. The electronic device of claim 1, wherein, when the first object is an object corresponding to a last object among the plurality of objects, the processor is further configured to display an object corresponding to a first object among the plurality of objects on the touch screen as the third object.

6. The electronic device of claim 1, wherein the user input is one of a touch input, a drag input, a scrolling input, a flick input, a swipe input, and a force touch input.

7. The electronic device of claim 1, wherein,
when a user input is detected within a designated threshold value for a touch input distance on the touch screen, the processor is further configured to determine the detected user input to be the first user input, and
when the user input is detected outside the designated threshold value for the touch input distance on the touch screen, the processor is further configured to determine the detected user input to be the second user input.

8. The electronic device of claim 1, wherein,
when a difference between a distance of a user input detected on the touch screen and a distance of a previously detected touch input is greater than a designated threshold value, the processor is further configured to determine the user input to be the second user input, and
when the difference between the distance of the user input detected on the touch screen and the distance of the previously detected touch input is less than or equal to the designated threshold value, the processor is further configured to determine the user input to be the first user input.

9. The electronic device of claim 1, wherein,
when a cumulative number of user inputs detected on the touch screen is greater than a designated threshold value, the processor is further configured to determine the user input to be the second user input, and
when the cumulative number of user inputs detected on the touch screen is less than or equal to the designated threshold value, the processor is further configured to determine the user input to be the first user input.

10. The electronic device of claim 9, wherein, when the plurality of sequentially arranged objects, which is displayed on the touch screen, is changed, the processor is further configured to initialize the cumulative number of the user inputs.

11. The electronic device of claim 1, wherein,
when a size of a user force touch input detected on the touch screen is less than or equal to a designated threshold value, the processor is further configured to determine the user force touch input to be the first user input, and
when the size of the user force touch input detected on the touch screen is greater than the designated threshold value, the processor is further configured to determine the user force touch input to be the second user input.

12. The electronic device of claim 1, wherein,
when a difference between an occurrence time of a user input detected on the touch screen and an occurrence time of a previously detected user input is less than or equal to a designated threshold value, the processor is further configured to determine the user input to be the second user input, and
when the difference between the occurrence time of the user input detected on the touch screen and the occurrence time of the previously detected user input is greater than the designated threshold value, the processor is further configured to determine the user input to be the first user input.

13. The electronic device of claim 1, wherein,
when a speed of a user input detected on the touch screen is greater than a designated threshold value, the processor is further configured to determine the user input to be the second user input, and
when the speed of the user input detected on the touch screen is greater than the designated threshold value, the processor is further configured to determine the user input to be the first user input.

14. The electronic device of claim 1, wherein,
when a time during which a user input detected on the touch screen is retained is greater than a designated threshold value, the processor is further configured to determine the user input to be the second user input, and
when the time during which the user input detected on the touch screen is retained is less than or equal to the designated threshold value, the processor is further configured to determine the user input to be the first user input.

15. The electronic device of claim 1, wherein, when reference information on one or more objects exists for the plurality of objects, the processor is further configured to configure an object designated regardless of the arrangement order among the one or more objects in which the reference information exists as the third object.

16. An electronic device comprising:
a touch screen; and
a processor configured to:
display a first portion of an object on the touch screen to correspond to a screen region of the touch screen,
display, when the first user input is detected via the touch screen while the first portion is displayed a second portion of the object subsequent to the first portion on the touch screen according to the same direction as a direction of a first user input that satisfies a first condition, and
display, when the second user input is detected via the touch screen while the first portion is displayed, a third portion of the object on the touch screen designated regardless of a direction of a second user input that satisfies a second condition.

17. The electronic device of claim 16, wherein the processor is further configured to determine a size of the second portion and a size of the third portion to correspond to a size of the screen region of the touch screen.

18. The electronic device of claim 16, wherein,
when the first portion corresponds to a last portion of the object, the processor is further configured to configure the connected second portion of the object as a first portion of the object according to the direction of the first user input, and
when the second portion corresponds to the first portion of the object, the processor is further configured to configure the second portion of the object as the last portion of the object according to the direction of the first user input.

19. A method of operating an electronic device comprising:
displaying a first object among a plurality of sequentially arranged objects on a touch screen of the electronic device;
detecting a user input via the touch screen while the first object is displayed; and
displaying a second object arranged subsequent to the first object according to an arrangement order among the plurality of objects on the touch screen when the detected user input is a first user input that satisfies a first condition, and displaying a third object designated regardless of the arrangement order among the plurality of objects on the touch screen when the detected user input is a second user input that satisfies a second condition.

20. A non-transitory computer-readable recording medium having instructions stored thereon, which when executed cause a processor to perform a method comprising:
displaying, by the processor, a first object among a plurality of sequentially arranged objects on a touch screen,
detecting, by the processor, a user input via the touch screen while the first object is displayed, and
displaying, by the processor, a second object arranged subsequent to the first object according to an arrangement order among the plurality of objects on the touch screen when the detected user input is a first user input that satisfies a first condition, and displaying a third object designated regardless of the arrangement order among the plurality of objects on the touch screen when the detected user input is a second user input that satisfies a second condition.

* * * * *